(12) United States Patent
Chen et al.

(10) Patent No.: US 11,252,043 B2
(45) Date of Patent: Feb. 15, 2022

(54) LINK GROUP CONFIGURATION METHOD AND APPARATUS

(71) Applicant: HUAWEI TECHNOLOGIES CO., LTD., Shenzhen (CN)

(72) Inventors: Qichang Chen, Shenzhen (CN); Desheng Sun, Shenzhen (CN); Shuai Xiao, Wuhan (CN); Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/129,948

(22) Filed: Dec. 22, 2020

(65) Prior Publication Data

US 2021/0111963 A1 Apr. 15, 2021

Related U.S. Application Data

(63) Continuation of application No. PCT/CN2019/079970, filed on Mar. 28, 2019.

(30) Foreign Application Priority Data

Jun. 22, 2018 (CN) .......................... 201810654975.4

(51) Int. Cl.
*H04L 12/24* (2006.01)

(52) U.S. Cl.
CPC .................................. *H04L 41/12* (2013.01)

(58) Field of Classification Search
CPC ............. H04J 3/1658; H04J 2203/0085; H04J 3/0647; H04L 41/12; H04L 25/14; Y02D 30/00

(Continued)

(56) References Cited

U.S. PATENT DOCUMENTS 8,401,026 B2    3/2013  Raman et al.
2013/0227338 A1* 8/2013  Lingafelt ............ H04L 12/4641
                                                714/4.5

(Continued)

FOREIGN PATENT DOCUMENTS

CN    102428679 A    4/2012
CN    107104907 A    8/2017

(Continued)

OTHER PUBLICATIONS

IA OIF-FLEXE-01.0. Flex Ethernet Implementation Agreement, Mar. 2016, 31 pages.

(Continued)

*Primary Examiner* — Frantz B Jean

(57) ABSTRACT

Embodiments of this application provide a link group configuration method and an apparatus. The link group configuration method includes: obtaining, by a first network device, candidate groups to which M physical ports of the first network device belong respectively; obtaining, by the first network device from a second network device, candidate groups to which M physical ports of the second network device belong respectively; and selecting N physical links from M physical links, as a link group between the first network device and the second network device, based on the candidate groups to which the M physical ports of the first network device belong respectively and the candidate groups to which the M physical ports of the second network device belong respectively.

19 Claims, 10 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2015/0263975 | A1* | 9/2015 | Srinivasan | H04L 12/28 370/235 |
| 2017/0230065 | A1* | 8/2017 | Saraswathyama | H04L 41/12 |
| 2018/0083890 | A1* | 3/2018 | Ishida | H04L 47/82 |
| 2019/0081884 | A1* | 3/2019 | Spohn | H04L 45/124 |
| 2019/0089590 | A1* | 3/2019 | Mohanty | H04L 41/0809 |
| 2020/0204500 | A1* | 6/2020 | Shah | H04L 67/34 |

FOREIGN PATENT DOCUMENTS

| | | |
|---|---|---|
| CN | 107438029 A | 12/2017 |
| CN | 107483337 A | 12/2017 |
| CN | 108075903 A | 5/2018 |
| CN | 108156074 A | 6/2018 |
| CN | 108809674 A | 11/2018 |
| CN | 109981235 A | 7/2019 |
| WO | 2010135345 A1 | 11/2010 |
| WO | 2018090856 A1 | 5/2018 |
| WO | 2018099161 A1 | 6/2018 |

OTHER PUBLICATIONS

IA OIF-FLEXE-ND-01.0. FlexE Neighbor Discovery Implementation Agreement, Sep. 12, 2018, 25 pages.
IA OIF-FLEXE-02.0. Flex Ethernet 2.0 Implementation Agreement, Jun. 22, 2018, 51 pages.
Notice of Allowance issued in CN 201810654975.4, dated Mar. 2, 2021, total 4 pages.
Extended European Search Report issued in EP Application No. 19821882.8, dated Jul. 9, 2021, total 7 pages.

* cited by examiner

LINK GROUP CONFIGURATION METHOD AND APPARATUS

CROSS-REFERENCE TO RELATED APPLICATIONS

This application is a continuation of International Application No. PCT/CN2019/079970, filed on Mar. 28, 2019, which claims priority to Chinese Patent Application No. 201810654975.4, filed on Jun. 22, 2018, The disclosures of the aforementioned applications are hereby incorporated by reference in their entireties.

TECHNICAL FIELD

This application relates to the field of communications, and in particular, to a link group configuration method and an apparatus.

BACKGROUND

Rate aggregation of flexible Ethernet (Flexible Ethernet, FlexE) allows a high-speed Ethernet service data flow to be carried over a plurality of low-rate physical interfaces together (that is, a plurality of physical links in a FlexE link group can be used to transmit data flows in parallel). Therefore, 5G market prospects and growth space of FlexE are promising.

Because of various factors, for example, different lengths and bending degrees of receiving optical fibers of different physical links in one FlexE link group, possible variances between optical-to-electrical conversion processing latencies of optical modules that are from different manufacturers and used for different link ports in the link group, and different wavelengths used for transmitting data flows over different physical links in a long-range transmission scenario, there are time skews between a plurality of physical interfaces in the FlexE link group on one side in a receiving direction. For any FlexE link group, if a time skew between a physical port fastest in receiving information and a physical port slowest in receiving information is beyond a tolerable time range of a time deskew buffer of the physical port fastest in receiving information (that is, a time skew tolerance of the physical port fastest in receiving information), the FlexE link group cannot work.

Considering that there are often time skews between physical ports, how to select suitable physical links to configure a properly functioning FlexE link group is an urgent problem to be resolved.

SUMMARY

Embodiments of this application provide a link group configuration method and an apparatus, to ensure that a link group functions properly.

According to a first aspect, an embodiment of this application provides a link group configuration method, including:

obtaining candidate groups to which M physical ports of a first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and selecting N physical links from the M physical links, as a link group between the first network device and the second network device, based on the candidate groups to which the M physical ports of the first network device belong respectively, where N is an integer greater than 1.

In a possible design, the link group configuration method further includes:

obtaining candidate groups to which the M physical ports of the second network device belong respectively; and the selecting N physical links from the M physical links, as a link group between the first network device and the second network device, based on the candidate groups to which the M physical ports of the first network device belong respectively includes:

selecting the N physical links from the M physical links, as the link group between the first network device and the second network device, based on the candidate groups to which the M physical ports of the first network device belong respectively and the candidate groups to which the M physical ports of the second network device belong respectively.

In a possible design, N physical ports, of the N physical links, that are located in the first network device belong to one candidate group, and N physical ports, of the N physical links, that are located in the second network device belong to one candidate group.

In a possible design, the selecting the N physical links from the M physical links, as the link group between the first network device and the second network device, based on the candidate groups to which the M physical ports of the first network device belong respectively and the candidate groups to which the M physical ports of the second network device belong respectively includes:

determining a first candidate group with a largest quantity of physical ports in the candidate groups to which the M physical ports of the first network device belong respectively, and determining a second candidate group with a largest quantity of physical ports in the candidate groups to which the M physical ports of the second network device belong respectively; and selecting physical links whose physical ports at both ends belong to the first candidate group and the second candidate group respectively, as a link group between the first network device and the second network device.

In a possible design, the obtaining candidate groups to which M physical ports of a $K^{th}$ network device belong respectively includes:

obtaining initial candidate group members of each of the M physical ports of the $K^{th}$ network device; and obtaining the candidate groups to which the M physical ports belong respectively, based on the initial candidate group members of each of the M physical ports, where the $K^{th}$ network device is the first network device or the second network device.

In a possible design, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

In a possible design, the obtaining the candidate groups to which the M physical ports belong respectively, based on the initial candidate group members of each of the M physical ports includes:

for any physical port, selecting an initial candidate group with a largest quantity of members from initial candidate groups including the physical port, as a candidate group of the physical port.

In a possible design, the obtaining the candidate groups to which the M physical ports belong respectively, based on the initial candidate group members of each of the M physical ports includes:

for any physical port, selecting an initial candidate group with a smallest in-group maximum time skew from initial candidate groups including the physical port, as a candidate group of the physical port, where the in-group maximum time skew is an information reception time skew between a fastest physical port in an initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

In a possible design, the obtaining the candidate groups to which the M physical ports belong respectively, based on the initial candidate group members of each of the M physical ports includes:

for any physical port, selecting an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

In a possible design, if it is impossible to select N physical links from the M physical links, as a link group between the first network device and the second network device, based on the candidate groups to which the M physical ports of the first network device belong respectively and the candidate groups to which the M physical ports of the second network device belong respectively, the link group configuration method further includes:

adjusting time skew tolerances of the M physical ports of the first network device and the M physical ports of the second network device, based on the candidate groups to which the M physical ports of the first network device belong respectively and the candidate groups to which the M physical ports of the second network device belong respectively; and re-performing the step of obtaining a link group between the first network device and the second network device, based on adjusted time skew tolerances of the M physical ports of the first network device and the M physical ports of the second network device.

In a possible design, the adjusting time skew tolerances of the M physical ports of the first network device and the M physical ports of the second network device, based on the candidate groups to which the M physical ports of the first network device belong respectively and the candidate groups to which the M physical ports of the second network device belong respectively includes:

determining a first candidate group, on the $K^{th}$ network device side, including a largest quantity of physical ports, and allocating, to a physical port of the first candidate group, a time deskew buffer of a physical port not included in the first candidate group on the $K^{th}$ network device side, where the $K^{th}$ network device is the first network device or the second network device.

In a possible design, before the obtaining initial candidate group members of each of the M physical ports of the $K^{th}$ network device, the link group configuration method further includes:

adjusting time skew tolerances of the M physical ports of the $K^{th}$ network device.

In a possible design, if it is impossible to select N physical links from the M physical links, as a link group between the first network device and the second network device, based on the candidate groups to which the M physical ports of the first network device belong respectively and the candidate groups to which the M physical ports of the second network device belong respectively, the link group configuration method further includes:

selecting M−1 physical links from the M physical links between the first network device and the second network device, where M is an integer greater than 2;

obtaining candidate groups to which M−1 physical ports, that belong to the M−1 physical links, of the first network device belong respectively, and determining candidate groups to which M−1 physical ports, that belong to the M−1 physical links, of the second network device belong respectively; and selecting N physical links from the M−1 physical links, as the link group between the first network device and the second network device, based on the candidate groups to which the M−1 physical ports of the first network device belong respectively and the candidate groups to which the M−1 physical ports of the second network device belong respectively.

According to a second aspect, an embodiment of this application further provides a link group configuration method, including:

sending, by a first network device to a link group configuration device, information about candidate groups to which M physical ports of the first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and receiving, by the first network device, information, about a link group between the first network device and the second network device, sent by the link group configuration device.

In a possible design, before the sending, by a first network device to a link group configuration device, candidate groups to which M physical ports of the first network device belong respectively, the link group configuration method further includes:

obtaining, by the first network device, initial candidate group members of each of the M physical ports of the first network device; and obtaining the candidate groups to which the M physical ports belong respectively, based on the initial candidate group members of each of the M physical ports of the first network device.

In a possible design, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

In a possible design, the obtaining, by the first network device, the candidate groups to which the M physical ports belong respectively, based on the initial candidate group members of each of the M physical ports includes:

for any physical port, selecting, by the first network device, an initial candidate group with a largest quantity of members from initial candidate groups including the physical port, as a candidate group of the physical port.

In a possible design, the obtaining, by the first network device, the candidate groups to which the M physical ports belong respectively, based on the initial candidate group members of each of the M physical ports includes:

for any physical port, selecting, by the first network device, an initial candidate group with a smallest in-group maximum time skew from initial candidate groups including the physical port, as a candidate group of the physical port, where the in-group maximum time skew is an information reception time skew between a fastest physical port in an initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

In a possible design, the obtaining, by the first network device, the candidate groups to which the M physical ports belong respectively, based on the initial candidate group members of each of the M physical ports includes:

for any physical port, selecting, by the first network device, an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

In a possible design, after the sending, by a first network device to a link group configuration device, information about candidate groups to which M physical ports of the first network device belong respectively, the link group configuration method further includes:

receiving, by the first network device, time skew tolerance adjustment information sent by the link group configuration device;

adjusting, by the first network device, time skew tolerances of the M physical ports of the first network device based on the time skew tolerance adjustment information;

obtaining, by the first network device, information about new candidate groups to which the M physical ports of the first network device belong respectively, based on adjusted time skew tolerances of the M physical ports of the first network device;

sending, by the first network device to the link group configuration device, the information about the new candidate groups to which the M physical ports of the first network device belong respectively; and receiving, by the first network device, information, about a link group between the first network device and the second network device, sent by the link group configuration device.

In a possible design, before the sending, by a first network device to a link group configuration device, information about candidate groups to which M physical ports of the first network device belong respectively, the link group configuration method further includes:

adjusting, by the first network device, time skew tolerances of the M physical ports of the first network device.

In a possible design, after the sending, by a first network device to a link group configuration device, information about candidate groups to which M physical ports of the first network device belong respectively, the method further includes:

receiving, by the first network device, physical link indication information sent by the link group configuration device;

determining, by the first network device, M−1 physical ports in the M physical ports based on the physical link indication information;

obtaining, by the first network device, information about new candidate groups to which the M−1 physical ports belong respectively;

sending, by the first network device to the link group configuration device, the information about the new candidate groups to which the M−1 physical ports belong respectively; and receiving, by the first network device, information, about a link group between the first network device and the second network device, sent by the link group configuration device.

According to a third aspect, this application further provides a link group configuration method, including:

sending, by a physical port on a first network device side, first information to a physical port, on a second network device side, that belongs to a same physical link as the physical port on the first network device side, where the first information carries an identifier of a candidate group to which the physical port on the first network device side belongs; and receiving, by the first network device, second information from the second network device, where the second information carries information about a link group between the first network device and the second network device, where a time skew between two physical ports that belong to one candidate group is not greater than a time skew tolerance of a physical port in the candidate group fastest in receiving information sent by a peer port of a physical link, and a time skew tolerance of a physical port in the two physical ports that is faster in receiving information sent by a peer port of a physical link.

In a possible design, the first information uses a link layer discovery protocol (Link Layer Discovery Protocol, LLDP) format.

In a possible design, the first information is sent on a segment management channel of a flexible Ethernet overhead frame.

In a possible design, the first information further includes time skew tolerance information of the physical port or a maximum time skew and a minimum time skew of a candidate group to which the physical port belongs, where the maximum time skew is an information reception time skew between a fastest physical port in the candidate group and a slowest physical port in the candidate group; the fastest physical port in the candidate group is a physical port in the candidate group fastest in receiving information sent by a peer physical port of a physical link; and the slowest physical port in the candidate group is a physical port in the candidate group slowest in receiving information sent by a peer physical port of a physical link; and the minimum time skew is an information reception time skew between a second slowest physical port in the candidate group and the slowest physical port in the candidate group; and the second slowest physical port in the candidate group is a physical port in the candidate group second slowest in receiving information sent by a peer physical port of a physical link.

In a possible design, the first information further includes an identifier of the physical port on the first network device side.

According to a fourth aspect, this application further provides a link group configuration device, configured to perform the link group configuration method in the first aspect. The link group configuration device includes:

a candidate group obtaining module, configured to obtain candidate groups to which M physical ports of a first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and a link group configuration module, configured to select N physical links from the M physical links, as a link group between the first network device and the second network device, based on the candidate groups to which the M physical ports of the first network device belong respectively, where N is an integer greater than 1.

In a possible design, the candidate group obtaining module is further configured to obtain candidate groups to which the M physical ports of the second network device belong respectively; and the link group configuration module is specifically configured to select the N physical links from the M physical links, as the link group between the first network device and the second network device, based on the candidate groups to which the M physical ports of the first network device belong respectively and the candidate groups to which the M physical ports of the second network device belong respectively.

In a possible design, N physical ports, of the N physical links, that are located in the first network device belong to one candidate group, and N physical ports, of the N physical links, that are located in the second network device belong to one candidate group.

In a possible design, the link group configuration module is specifically configured to:

determine a first candidate group with a largest quantity of physical ports in the candidate groups to which the M physical ports of the first network device belong respectively, and determine a second candidate group with a largest quantity of physical ports in the candidate groups to which the M physical ports of the second network device belong respectively; and select physical links whose physical ports at both ends belong to the first candidate group and the second candidate group respectively, as a link group between the first network device and the second network device.

In a possible design, the candidate group obtaining module includes an initial candidate group obtaining unit and a candidate group obtaining unit, where the initial candidate group obtaining unit is configured to obtain initial candidate group members of each of the M physical ports of the $K^{th}$ network device; and the candidate group obtaining unit is configured to obtain the candidate groups to which the M physical ports belong respectively, based on the initial candidate group members of each of the M physical ports, where the $K^{th}$ network device is the first network device or the second network device.

In a possible design, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

In a possible design, the candidate group obtaining unit is specifically configured to:

for any physical port, select an initial candidate group with a largest quantity of members from initial candidate groups including the physical port, as a candidate group of the physical port.

In a possible design, the candidate group obtaining unit is specifically configured to:

for any physical port, select an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

In a possible design, the candidate group obtaining unit is specifically configured to:

for any physical port, select an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

In a possible design, if it is impossible to select N physical links from the M physical links, as a link group between the first network device and the second network device, based on the candidate groups to which the M physical ports of the first network device belong respectively and the candidate groups to which the M physical ports of the second network device belong respectively, the link group configuration apparatus further includes:

a time skew tolerance adjustment module, configured to adjust time skew tolerances of the M physical ports of the first network device and the M physical ports of the second network device, based on the candidate groups to which the M physical ports of the first network device belong respectively and the candidate groups to which the M physical ports of the second network device belong respectively.

In a possible design, the time skew tolerance adjustment module is specifically configured to:

determine a first candidate group, on the $K^{th}$ network device side, including a largest quantity of physical ports, and allocate, to a physical port of the first candidate group, a time deskew buffer of a physical port not included in the first candidate group on the $K^{th}$ network device side, where the $K^{th}$ network device is the first network device or the second network device.

In a possible design, the link group configuration apparatus further includes:

a time skew tolerance adjustment module, configured to adjust time skew tolerances of the M physical ports of the $K^{th}$ network device before initial candidate group members of each of the M physical ports of the $K^{th}$ network device are obtained.

In a possible design, if it is impossible to select N physical links from the M physical links, as a link group between the first network device and the second network device, based on the candidate groups to which the M physical ports of the first network device belong respectively and the candidate groups to which the M physical ports of the second network device belong respectively, the link group configuration device further includes: a physical link selection module, configured to select M−1 physical links from the M physical links between the first network device and the second network device, where M is an integer greater than 2.

According to a fifth aspect, an embodiment of this application provides a network device as a first network device, including:

a sending module, configured to send, to a link group configuration device, information about candidate groups to which M physical ports of the first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and a receiving module, configured to receive information, about a link group between the first network device and the second network device, sent by the link group configuration device.

In a possible design, the first network device further includes a candidate group obtaining module, where the candidate group obtaining module includes an initial candidate group obtaining unit and a candidate group obtaining unit, where the initial candidate group obtaining unit is configured to obtain initial candidate group members of each of the M physical ports of the first network device; and the candidate group obtaining unit is configured to obtain the candidate groups to which the M physical ports belong respectively, based on the initial candidate group members of each of the M physical ports.

In a possible design, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

In a possible design, the candidate group obtaining unit is specifically configured to:

for any physical port, select, by the first network device, an initial candidate group with a largest quantity of members from initial candidate groups including the physical port, as a candidate group of the physical port.

In a possible design, the candidate group obtaining unit is specifically configured to:

for any physical port, select, by the first network device, an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

In a possible design, the candidate group obtaining unit is specifically configured to:

for any physical port, select, by the first network device, an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

In a possible design, the receiving module is further configured to receive time skew tolerance adjustment information sent by the link group configuration device;

the first network device further includes a time skew tolerance adjustment module, configured to adjust time skew tolerances of the M physical ports of the first network device based on the time skew tolerance adjustment information;

the candidate group obtaining module is further configured to obtain information about new candidate groups to which the M physical ports of the first network device belong respectively, based on adjusted time skew tolerances of the M physical ports of the first network device;

the sending module is further configured to send, to the link group configuration device, the information about the new candidate groups to which the M physical ports of the first network device belong respectively; and the receiving module is further configured to receive information, about a link group between the first network device and the second network device, sent by the link group configuration device.

In a possible design, the first network device further includes a time skew tolerance adjustment module, where the time skew tolerance adjustment module is configured to adjust time skew tolerances of the M physical ports of the first network device before the information about the candidate groups to which the M physical ports of the first network device belong respectively is sent to the link group configuration device.

In a possible design, the receiving module is further configured to receive physical link indication information sent by the link group configuration device;

the first network device further includes a physical link selection module;

the physical link selection module is configured to determine M−1 physical ports in the M physical ports based on the physical link indication information;

the candidate group obtaining module is further configured to obtain information about new candidate groups to which the M−1 physical ports belong respectively;

the sending module is further configured to send, to the link group configuration device, the information about the new candidate groups to which the M−1 physical ports belong respectively; and the receiving module is further configured to receive information, about a link group between the first network device and the second network device, sent by the link group configuration device.

According to a sixth aspect, this application further provides a network device as a first network device, including:

a sending module, configured to send, through a physical port on a first network device side, first information to a physical port, on a second network device side, that belongs to a same physical link as the physical port on the first network device side, where the first information carries an identifier of a candidate group to which the physical port on the first network device side belongs; and a receiving module, configured to receive second information from the second network device, where the second information carries information about a link group between the first network device and the second network device, where a time skew between two physical ports that belong to one candidate group is not greater than a time skew tolerance of a physical port in the candidate group fastest in receiving information sent by a peer port of a physical link, and a time skew tolerance of a physical port in the two physical ports that is faster in receiving information sent by a peer port of a physical link.

In a possible design, the first information uses a link layer discovery protocol (Link Layer Discovery Protocol, LLDP) format.

In a possible design, the first information is sent on a segment management channel of a flexible Ethernet overhead frame.

In a possible design, the first information further includes time skew tolerance information of the physical port or a maximum time skew and a minimum time skew of a candidate group to which the physical port belongs, where the maximum time skew is an information reception time skew between a fastest physical port in the candidate group and a slowest physical port in the candidate group; the fastest physical port in the candidate group is a physical port in the candidate group fastest in receiving information sent by a peer physical port of a physical link; and the slowest physical port in the candidate group is a physical port in the candidate group slowest in receiving information sent by a peer physical port of a physical link; and the minimum time skew is an information reception time skew between a second slowest physical port in the candidate group and the slowest physical port in the candidate group; and the second slowest physical port in the candidate group is a physical port in the candidate group second slowest in receiving information sent by a peer physical port of a physical link.

In a possible design, the first information further includes an identifier of the physical port on the first network device side.

According to a seventh aspect, this application further provides a network device, configured to perform the link group configuration method in the first aspect. The network device includes:

a processor, configured to obtain candidate groups to which M physical ports of a first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and the processor is further configured to select N physical links from the M physical links, as a link group between the first network device and the second network device, based on the candidate groups to which the M physical ports of the first network device belong respectively, where N is an integer greater than 1.

In a possible design, the processor is further configured to obtain candidate groups to which the M physical ports of the second network device belong respectively; and the processor is further configured to select the N physical links from the M physical links, as the link group between the first network device and the second network device, based on the candidate groups to which the M physical ports of the first network device belong respectively and the candidate groups to which the M physical ports of the second network device belong respectively.

In a possible design, N physical ports, of the N physical links, that are located in the first network device belong to one candidate group, and N physical ports, of the N physical links, that are located in the second network device belong to one candidate group.

In a possible design, the processor is further configured to:

determine a first candidate group with a largest quantity of physical ports in the candidate groups to which the M physical ports of the first network device belong respectively, and determine a second candidate group with a largest quantity of physical ports in the candidate groups to which the M physical ports of the second network device belong respectively; and select physical links whose physical ports at both ends belong to the first candidate group and the second candidate group respectively, as a link group between the first network device and the second network device.

In a possible design, the processor is further configured to:
obtain initial candidate group members of each of the M physical ports of the $K^{th}$ network device; and
obtain the candidate groups to which the M physical ports belong respectively, based on the initial candidate group members of each of the M physical ports, where
the $K^{th}$ network device is the first network device or the second network device.

In a possible design, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

In a possible design, the processor is specifically configured to:
for any physical port, select an initial candidate group with a largest quantity of members from initial candidate groups including the physical port, as a candidate group of the physical port.

In a possible design, the processor is specifically configured to: for any physical port, select an initial candidate group with a smallest in-group maximum time skew from initial candidate groups including the physical port, as a candidate group of the physical port, where
the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

In a possible design, the processor is specifically configured to: for any physical port, select an initial candidate group with a smallest in-group average time skew from initial candidate groups including the physical port, as a candidate group of the physical port, where
when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

In a possible design, if it is impossible to select N physical links from the M physical links, as a link group between the first network device and the second network device, based on the candidate groups to which the M physical ports of the first network device belong respectively and the candidate groups to which the M physical ports of the second network device belong respectively,
the processor is further configured to adjust time skew tolerances of the M physical ports of the first network device and the M physical ports of the second network device, based on the candidate groups to which the M physical ports of the first network device belong respectively and the candidate groups to which the M physical ports of the second network device belong respectively.

In a possible design, the processor is specifically configured to:
determine a first candidate group, on the $K^{th}$ network device side, including a largest quantity of physical ports, and allocate, to a physical port of the first candidate group, a time deskew buffer of a physical port not included in the first candidate group on the $K^{th}$ network device side, where
the $K^{th}$ network device is the first network device or the second network device.

In a possible design, the processor is further configured to adjust time skew tolerances of the M physical ports of the $K^{th}$ network device before the initial candidate group members of each of the M physical ports of the $K^{th}$ network device are obtained.

In a possible design, if it is impossible to select N physical links from the M physical links, as a link group between the first network device and the second network device, based on the candidate groups to which the M physical ports of the first network device belong respectively and the candidate groups to which the M physical ports of the second network device belong respectively, the processor is further configured to:
select M−1 physical links from the M physical links between the first network device and the second network device, where M is an integer greater than 2.

According to an eighth aspect, an embodiment of this application further provides a network device as a first network device, including:
a sender, configured to send, to a link group configuration device, information about candidate groups to which M physical ports of the first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and
a receiver, configured to receive information, about a link group between the first network device and the second network device, sent by the link group configuration device.

In a possible design, the first network device further includes a processor, where
the processor is configured to obtain initial candidate group members of each of the M physical ports of the first network device; and
obtain the candidate groups to which the M physical ports belong respectively, based on the initial candidate group members of each of the M physical ports.

In a possible design, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

In a possible design, the processor is specifically configured to:

for any physical port, select, by the first network device, an initial candidate group with a largest quantity of members from initial candidate groups including the physical port, as a candidate group of the physical port.

In a possible design, the processor is specifically configured to:

for any physical port, select, by the first network device, an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

In a possible design, the processor is specifically configured to:

for any physical port, select, by the first network device, an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

In a possible design, the receiver is further configured to receive time skew tolerance adjustment information sent by the link group configuration device;

the processor is further configured to adjust time skew tolerances of the M physical ports of the first network device based on the time skew tolerance adjustment information;

the processor is further configured to obtain information about new candidate groups to which the M physical ports of the first network device belong respectively, based on adjusted time skew tolerances of the M physical ports of the first network device;

the sender is further configured to send, to the link group configuration device, the information about the candidate groups to which the M physical ports of the first network device belong respectively; and the receiver is further configured to receive information, about a link group between the first network device and the second network device, sent by the link group configuration device.

In a possible design, the processor is further configured to adjust time skew tolerances of the M physical ports of the first network device before the information about the candidate groups to which the M physical ports of the first network device belong respectively is sent to the link group configuration device.

In a possible design, the receiver is further configured to receive physical link indication information sent by the link group configuration device;

the processor is further configured to determine M−1 physical ports in the M physical ports based on the physical link indication information, and obtain information about new candidate groups to which the M−1 physical ports belong respectively;

the sender is further configured to send, to the link group configuration device, the information about the new candidate groups to which the M−1 physical ports belong respectively; and the receiver is further configured to receive information, about a link group between the first network device and the second network device, sent by the link group configuration device.

According to a ninth aspect, this application further provides a network device as a first network device, including:

a sender, configured to send, through a physical port on a first network device side, first information to a physical port, on a second network device side, that belongs to a same physical link as the physical port on the first network device side, where the first information carries an identifier of a candidate group to which the physical port on the first network device side belongs; and a receiver, configured to receive second information from the second network device, where the second information carries information about a link group between the first network device and the second network device, where a time skew between two physical ports that belong to one candidate group is not greater than a time skew tolerance of a physical port in the candidate group fastest in receiving information sent by a peer port of a physical link, and a time skew tolerance of a physical port in the two physical ports that is faster in receiving information sent by a peer port of a physical link.

In a possible design, the first information uses a link layer discovery protocol (Link Layer Discovery Protocol, LLDP) format.

In a possible design, the first information is sent on a segment management channel of a flexible Ethernet overhead frame.

In a possible design, the first information further includes time skew tolerance information of the physical port or a maximum time skew and a minimum time skew of a candidate group to which the physical port belongs, where the maximum time skew is an information reception time skew between a fastest physical port in the candidate group and a slowest physical port in the candidate group; the fastest physical port in the candidate group is a physical port in the candidate group fastest in receiving information sent by a peer physical port of a physical link; and the slowest physical port in the candidate group is a physical port in the candidate group slowest in receiving information sent by a peer physical port of a physical link; and the minimum time skew is an information reception time skew between a second slowest physical port in the candidate group and the slowest physical port in the candidate group; and the second slowest physical port in the candidate group is a physical port in the candidate group second slowest in receiving information sent by a peer physical port of a physical link.

In a possible design, the first information further includes an identifier of the physical port on the first network device side.

According to a tenth aspect, this application further provides a network device, including a memory, a processor, and a computer program, where the computer program is stored in the memory, and the processor runs the computer program to perform the link group configuration method according to the first aspect and the possible implementations of the first aspect.

According to an eleventh aspect, this application further provides a network device, including a memory, a processor, and a computer program, where the computer program is stored in the memory, and the processor runs the computer program to perform the link group configuration method according to the second aspect and the possible implementations of the second aspect.

According to a twelfth aspect, this application further provides a network device, including a memory, a processor, and a computer program, where the computer program is stored in the memory, and the processor runs the computer program to perform the link group configuration method according to the third aspect and the possible implementations of the third aspect.

According to a thirteenth aspect, this application further provides a computer storage medium, where the storage medium includes a computer program, and the computer program is used to implement the link group configuration method according to the first aspect and the possible implementations of the first aspect.

According to a fourteenth aspect, this application further provides a computer storage medium, where the storage medium includes a computer program, and the computer program is used to implement the link group configuration method according to the second aspect and the possible implementations of the second aspect.

According to a fifteenth aspect, this application further provides a computer storage medium, where the storage medium includes a computer program, and the computer program is used to implement the link group configuration method according to the third aspect and the possible implementations of the third aspect.

According to a sixteenth aspect, this application further provides a computer program product, where the computer program product includes computer program code, and when the computer program code is run on a computer, the computer is enabled to perform the link group configuration method according to the first aspect and the possible implementations of the first aspect.

According to a seventeenth aspect, this application further provides a computer program product, where the computer program product includes computer program code, and when the computer program code is run on a computer, the computer is enabled to perform the link group configuration method according to the second aspect and the possible implementations of the second aspect.

According to an eighteenth aspect, this application further provides a computer program product, where the computer program product includes computer program code, and when the computer program code is run on a computer, the computer is enabled to perform the link group configuration method according to the third aspect and the possible implementations of the third aspect.

According to a nineteenth aspect, this application further provides a chip, including a memory and a processor, where the memory is configured to store a computer program, and the processor is configured to invoke the computer program from the memory and run the computer program to enable a network device provided with the chip to perform the link group configuration method according to the first aspect and the possible implementations of the first aspect.

According to a twentieth aspect, this application further provides a chip, including a memory and a processor, where the memory is configured to store a computer program, and the processor is configured to invoke the computer program from the memory and run the computer program to enable a network device provided with the chip to perform the link group configuration method according to the second aspect and the possible implementations of the second aspect.

According to a twenty-first aspect, this application further provides a chip, including a memory and a processor, where the memory is configured to store a computer program, and the processor is configured to invoke the computer program from the memory and run the computer program to enable a network device provided with the chip to perform the link group configuration method according to the third aspect and the possible implementations of the third aspect.

Based on the implementations provided in the foregoing aspects, further combination may be made in this application to provide more implementations.

DESCRIPTION OF EMBODIMENTS

Figure 1:
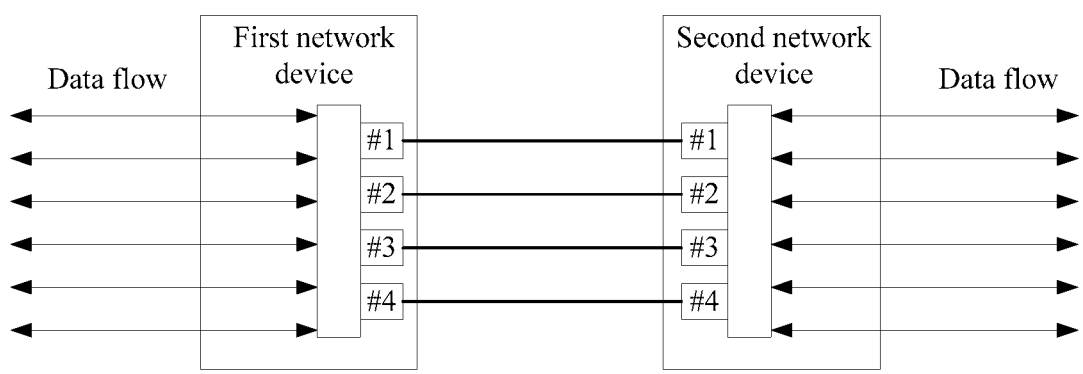
FIG. 1 is a schematic structural diagram of a communications system according to an embodiment of this application.

FIG. 1 is a schematic structural diagram of a communications system according to an embodiment of this application. As shown in FIG. 1, the communications system may include at least two network devices, for example, a first network device and a second network device shown in FIG. 1.

A network device in the communications system in this embodiment of this application may act as a long term evolution (long term evolution, LTE) communications system and a new radio (New Radio, NR) communications system, for example, a 5th-generation (5th-generation, 5G) mobile bearer network device. Certainly, the communications system may alternatively be another type of communications system, and this is not limited in this embodiment of this application.

The first network device and the second network device in this application are provided with physical ports that support flexible Ethernet. FIG. 1 is given by using an example in which the first network device and the second network device each are provided with four physical ports, where the physical ports of the first network device are connected to the physical ports of the second network device in a one-to-one correspondence, to form physical links. For example, FIG. 1 shows four physical links between the first network device and the second network device. The first network device may perform information exchange with the second network device through the four physical links.

Rate aggregation of the flexible Ethernet allows a high-speed Ethernet service data flow to be carried over a plurality of same-rate physical interfaces together (that is, the flexible Ethernet allows data flows to be transmitted in parallel through a plurality of physical links). The physical links for carrying the data flows together form a FlexE link group. However, because of various factors, for example, different lengths of receiving optical fibers of different physical links in one link group, different bending degrees of the optical fibers of the links, possible variances between photoelectric conversion latencies of optical modules used for link ports, and different wavelengths used for transmitting data flows over different physical links in a long-range transmission scenario, there may be time skews (Skew) between a plurality of physical interfaces in the FlexE link group on one side in a receiving direction.

For any FlexE link group, if a time skew between a physical port fastest in receiving information and a physical port slowest in receiving information is beyond a tolerable time range of a time deskew buffer (Deskew buffer) of the physical port fastest in receiving information (that is, a time skew tolerance (Skew tolerance) of the physical port fastest in receiving information), the FlexE link group cannot work.

The time deskew buffer means that a physical port relatively fast in receiving information may buffer a specific quantity of code blocks for compensating a time skew between the physical port and another physical port in one link group to which the two physical ports belong.

The time skew tolerance is a time equivalently corresponding to a quantity of code blocks that can be buffered by a deskew buffer of a physical port. For example, a deskew buffer of a 100 Gbps physical port may buffer 469 64/66b code blocks (one 64/66b code block occupies a transmission time of 0.64 ns on a 100 Gbps physical interface), and this is equivalent to that the physical port can tolerate a time skew of 469×0.64 ns=300.16 ns.

An embodiment of this application provides a link group configuration method, to resolve a problem of how to select suitable physical links to configure a properly functioning FlexE link group. For details about specific solutions, refer to a plurality of embodiments below.

Embodiment 1

Figure 2:
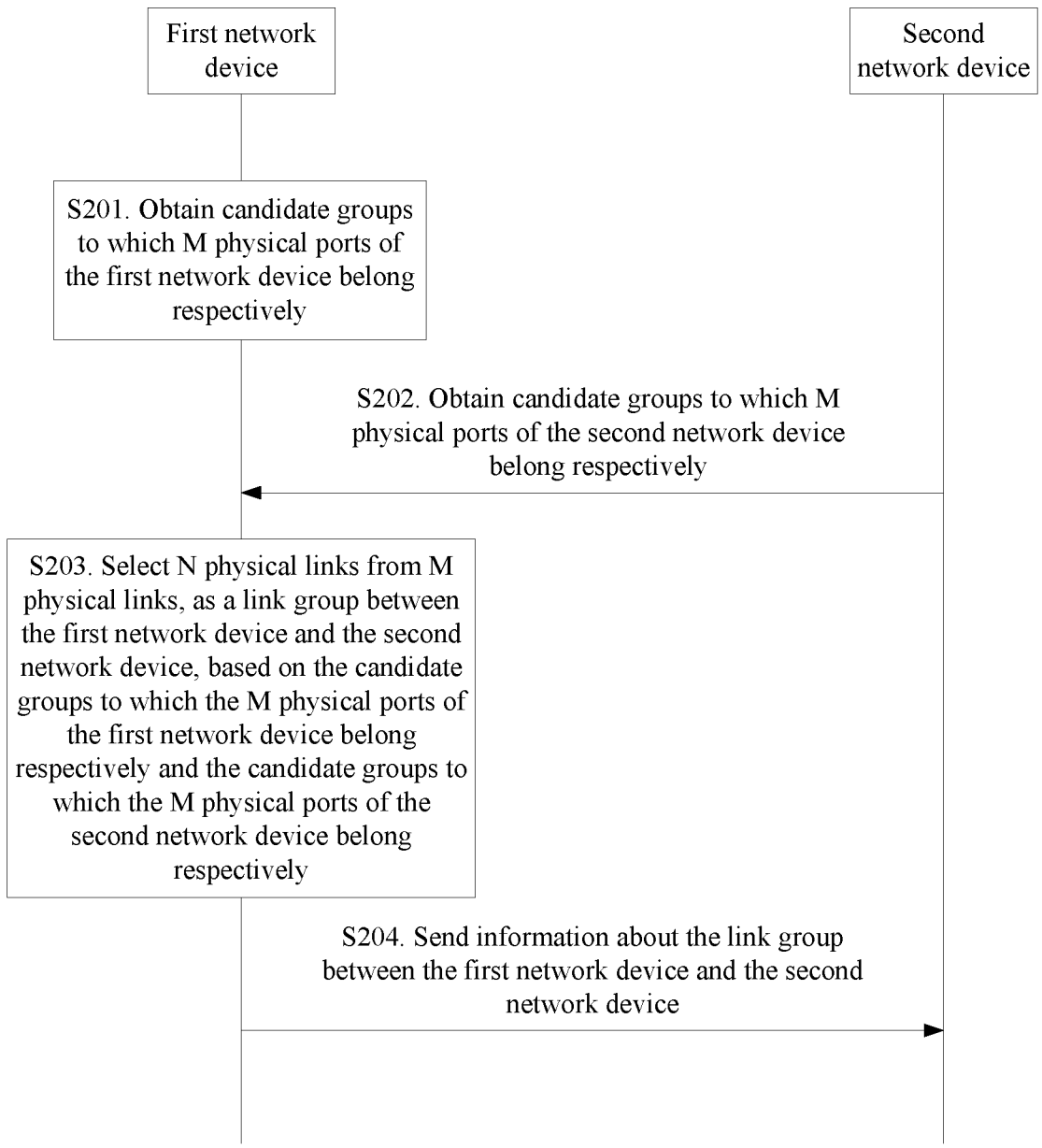
FIG. 2 is a schematic flowchart 1 of a link group configuration method according to an embodiment of this application.

FIG. 2 is a schematic flowchart 1 of a link group configuration method according to an embodiment of this application. In this embodiment, by obtaining information about candidate groups to which physical ports of a first network device and a second network device belong respectively, a link group is determined from a plurality of physical links between the first network device and the second network device based on the information about the candidate groups of the physical ports. The link group configured in this embodiment of this application can function properly. The method is performed by a network device. For example, the network device may be the first network device or the second network device shown in FIG. 1, or may be a third network device connected to the first network device and the second network device. The third network device may be connected to both the first network device and the second network device through management channels, or may be connected to one of the first network device and the second network device through a physical link. In other words, an execution body of the method is not strictly limited in this embodiment, and there may be a plurality of possible implementations, and details are not enumerated. In the following embodiments of this application, link group configuration methods in the embodiments of this application are illustrated by using an example in which the first network device is an execution body. As shown in FIG. 2, the method may include the following steps.

S201. The first network device obtains candidate groups to which M physical ports of the first network device belong respectively.

The M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1.

For example, as shown in FIG. 1, the first network device and the second network device each are provided with at least M physical ports, where M physical ports of the first network device are connected to M physical ports of the second device in a one-to-one correspondence, to form M physical links between the first network device and the second network device. The M physical ports of the first network device are distributed in different candidate groups. Optionally, a physical port in this embodiment may belong to only one candidate group.

In this embodiment, physical ports are distributed in different candidate groups based on a speed at which each physical port receives information sent by a peer physical port of a physical link. For example, for the M physical ports on the first network device side, information is sent to the M physical ports on the first network device side simultaneously from the M physical ports on the second network device side. Optionally, the information may be a FlexE overhead frame (FlexE Overhead Frame), and one FlexE overhead frame includes eight FlexE overhead blocks (FlexE Overhead Block). Correspondingly, the first network device counts a time for receiving a FlexE overhead block in the FlexE overhead frame by the M physical ports. In this way, a time skew between any two physical ports of the M physical ports of the first network device may be calculated. Optionally, the first network device may use a timestamp to record a moment at which each of the M physical ports receives a FlexE overhead block of the FlexE overhead frame; or use a counter to record numerical values when the M physical ports receive a FlexE overhead block of the FlexE overhead frame, and obtain, through conversion based on a unit time represented by each numerical value, a time for receiving the FlexE overhead block of the FlexE overhead frame by each of the M physical ports.

In this embodiment, for any physical port in the candidate group, an information reception time skew between the physical port and a physical port in the candidate group slowest in receiving information is within a time skew tolerance range of the physical port. For example, when a candidate group 1 includes three physical ports: a physical port 1, a physical port 2, and a physical port 3, assuming that the physical port 1 receives a FlexE overhead block at 200 ns, the physical port 2 receives the same FlexE overhead block at 300 ns, and the physical port 3 receives the same FlexE overhead block at 350 ns, the physical port 3 is a physical port in the candidate group 1 slowest in receiving information. A time skew of 150 ns between the physical port 1 and the physical port 3 needs to be within a time skew tolerance range of the physical port 1. In this case, a time skew of 50 ns between the physical port 2 slower in receiving information than the physical port 1 and the physical port 3 is definitely within the time skew tolerance range of the physical port 1. In addition, the time skew of 50 ns between the physical port 2 and the physical port 3 may further need to be within a time skew tolerance range of the physical port 2.

Optionally, the first network device may alternatively be provided with L physical ports, where L is an integer greater than M. Before configuring a link group, the first network device first determines, from the L physical ports, M physical ports on the first network device side for constructing M physical links of the link group.

Optionally, that the first network device obtains candidate groups to which M physical ports of the first network device belong respectively may specifically include the following steps.

S11. Obtain initial candidate group members of each of the M physical ports of the first network device.

For example, before the candidate groups of the M physical ports of the first network device belong respectively are obtained, the initial candidate group members of each of the M physical ports of the first network device may be determined first. A specific determining manner of an initial candidate group may be based on a time skew between physical ports. For example, two physical ports with a minimum time skew may be grouped into one initial candidate group.

Optionally, in a possible determining manner of an initial candidate group, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

For example, as shown in FIG. 1, the first network device includes four physical ports, and they are denoted as a physical port #1, a physical port #2, a physical port #3, and a physical port #4. Times for receiving, by the physical ports, information sent by peer physical ports of physical links to which the physical ports belong are t_1=1,000,000, 100 ns, t_2=1,000,000,250 ns, t_3=1,000,000,360 ns, and t_4=1,000,000,610 ns. All of time skew tolerances of the physical ports are 300 ns.

During determining initial candidate group members corresponding to each physical port, specific steps may be described below.

S1101. Determine a physical port fastest in receiving information, namely the physical port #1, and add each port with a time skew with the physical port #1 not greater than a time skew tolerance of the physical port #1 into an initial candidate group of the physical port #1.

For example, for the physical port #1, the physical port #1 is added into the initial candidate group of the physical port #1.

Optionally, an identifier 1 may be added for the initial candidate group of the physical port #1 to distinguish from an initial candidate group of another physical port.

A time skew between the physical port #2 and the physical port #1 is skew_1_2=t_2−t_1=150 ns, and skew_1_2<=300 ns. Therefore, the physical port #2 is added into the initial candidate group 1 of the physical port #1.

A time skew between the physical port #3 and the physical port #1 is skew_1_3=t_3−t_1=260 ns, and skew_1_3<=300 ns. Therefore, the physical port #3 is added into the initial candidate group 1 of the physical port #1.

A time skew between the physical port #4 and the physical port #1 is skew_1_4=t_4−t_1=510 ns, and skew_1_4>300 ns. Therefore, the physical port #4 does not belong to the initial candidate group 1 of the physical port #1.

To sum up, port members of the initial candidate group 1 corresponding to the physical port #1 are <the physical port #1, the physical port #2, and the physical port #3>.

S1102. Determine a physical port second fastest in receiving information, namely the physical port #2; and add, from all physical ports with information reception speeds not greater than that of the physical port #2, each port with a time skew with the physical port #2 not greater than a time skew tolerance of the physical port #2 into an initial candidate group of the physical port #2.

For example, for the physical port #2, the physical port #2 is added into the initial candidate group 2 of the physical port #2.

A time skew between the physical port #3 and the physical port #2 is skew_2_3=t_3−t_2=110 ns, and skew_2_3<=300 ns. Therefore, the physical port #3 is added into the initial candidate group 2 of the physical port #2.

A time skew between the physical port #4 and the physical port #1 is skew_2_4=t_4−t_2=360 ns, and skew_2_4>300 ns. Therefore, the physical port #4 does not belong to the initial candidate group 2 of the physical port #2.

To sum up, port members of the initial candidate group 2 corresponding to the physical port #2 are <the physical port #2 and the physical port #3>.

S1103. Determine, with reference to step S22, initial candidate group members of each of the remaining physical ports of the first network device.

For example, for the physical port #3, the physical port #3 is added into an initial candidate group 3 of the physical port #3.

A time skew between the physical port #4 and the physical port #3 is skew_3_4=t_4−t_3=250 ns, and skew_3_4<=300 ns. Therefore, the physical port #4 is added into the initial candidate group 3 of the physical port #3.

To sum up, port members of the initial candidate group 3 corresponding to the physical port #3 are <the physical port #3 and the physical port #4>.

For example, for the physical port #4, the physical port #4 is added into an initial candidate group 4 of the physical port #4. Therefore, a port member of the initial candidate group 4 corresponding to the physical port #4 is <the physical port #4>.

S12. Obtain the candidate groups to which the M physical ports belong respectively, based on the initial candidate group members of each of the M physical ports.

For example, after determining the initial candidate group members of each of the M physical ports, the first network device may determine specific initial candidate groups to which the physical ports belong, and select, based on member information of each initial candidate group, an initial candidate group from at least one initial candidate group including all the physical ports, as a candidate group to which the physical ports finally belong.

The following describes in detail a manner for determining the candidate groups to which the M physical ports belong respectively.

In a feasible solution for determining a candidate group to which a physical port belongs, for any physical port of the M physical ports, an initial candidate group with a largest quantity of members is selected from initial candidate groups including the physical port, as a candidate group of the physical port.

For example, for the physical port #1, it may be determined that there is only one initial candidate group including the physical port #1, and in this case, the initial candidate group 1 may act as a candidate group of the physical port #1.

For the physical port #2, for example, in the examples in S11, it may be determined that both the initial candidate groups 1 and 2 include the physical port #2. In this case, if a member quantity of the initial candidate group 1 is larger than that of the initial candidate group 2, the initial candidate group 1 is determined as a candidate group of the physical port #2.

Optionally, if the member quantity of the initial candidate group 1 is equal to that of the initial candidate group 2, an initial candidate group with a smaller initial candidate group number may be selected as a candidate group of the physical port #2. Optionally, a candidate group of a physical port may be determined between two initial candidate groups with a same member quantity according to another principle, and this is not limited in this application.

For the physical port #3, for example, in the examples in S11, it may be determined that all of the initial candidate groups 1, 2, and 3 include the physical port #3. In this case, if the member quantity of the initial candidate group 2 and a member quantity of the initial candidate group 3 are equal, but are both smaller than the member quantity of the initial candidate group 1, the initial candidate group 1 is determined as a candidate group of the physical port #3.

For the physical port #4, for example, in the examples in S11, both the initial candidate groups 3 and 4 include the physical port #4. In this case, if the member quantity of the initial candidate group 3 is larger than that of the initial candidate group 4, the initial candidate group 3 is determined as a candidate group of the physical port #4.

To sum up, it may be determined that the M physical ports belong to two candidate groups. One candidate group includes the physical port #1, the physical port #2, and the physical port #3, and the other candidate group includes the physical port #4.

A candidate group is selected for a physical port based on a principle of selecting a candidate group with a largest quantity of members, so that a member quantity of the candidate group may be large as much as possible, so as to help select a link group subsequently based on information about the candidate group.

In another feasible solution for determining a candidate group to which a physical port belongs, for any physical port of the M physical ports, an initial candidate group with a smallest in-group maximum time skew is selected from initial candidate groups including the physical port, as a candidate group of the physical port.

The in-group maximum time skew is an information reception time skew between a fastest physical port in an initial candidate group and a slowest physical port in the initial candidate group. The fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

For example, for the physical port #1, it may be determined that there is only one initial candidate group including the physical port #1, and in this case, the initial candidate group 1 may act as a candidate group of the physical port #1.

For the physical port #2, for example, in the examples in S11, it may be determined that both the initial candidate groups 1 and 2 include the physical port #2. In-group time skews of the initial candidate group 1 are skew_1_2=150 ns and skew_1_3=260 ns. Therefore, an in-group maximum time skew of the initial candidate group 1 is skew_1_3=260 ns. An in-group time skew of the initial candidate group 2 is only skew_2_3=110 ns. Therefore, an in-group maximum time skew of the initial candidate group 2 is skew_2_3=110 ns. Because the in-group maximum time skew of the initial candidate group 2 is smaller than that of the initial candidate group 1, the initial candidate group 2 is determined as a candidate group of the physical port #2.

Optionally, if the in-group maximum time skew of the initial candidate group 1 is equal to that of the initial candidate group 2, an initial candidate group with a smaller initial candidate group number may be selected as a candidate group of the physical port #2. Optionally, a candidate group of a physical port may be determined between two initial candidate groups with a same in-group maximum time skew according to another principle, and this is not limited in this application.

For the physical port #3, for example, in the examples in S11, it may be determined that all of the initial candidate groups 1, 2, and 3 include the physical port #3. An in-group time skew of the initial candidate group 3 is only skew_3_4=250 ns. Therefore, the in-group maximum time skew of the initial candidate group 3 is skew_3_4=250 ns. Because the in-group maximum time skew of the initial candidate group 2 is smaller than that of the initial candidate group 1 and that of the initial candidate group 3, the initial candidate group 2 is determined as a candidate group of the physical port #3.

For the physical port #4, for example, in the examples in S11, both the initial candidate groups 3 and 4 include the physical port #4. In this case, because the initial candidate group 4 has only one member, a maximum time skew of the initial candidate group 4 is 0. Therefore, the initial candidate group 4 is determined as a candidate group of the physical port #4.

To sum up, it may be determined that the M physical ports belong to three candidate groups. One candidate group includes the physical port #1, one candidate group includes the physical port #2 and the physical port #3, and the other candidate group includes the physical port #4.

Physical ports are grouped into candidate groups with time skews as small as possible according to a smallest in-group maximum time skew principle, to ensure that a link group functions properly.

Optionally, for the physical port #4, a candidate group of the physical port #4 may be alternatively determined in an initial candidate group whose in-group maximum time skew is not 0, that is, the initial candidate group 3 is determined as a candidate group of the physical port #4.

In yet another feasible solution for determining a candidate group to which a physical port belongs, for any physical port of the M physical ports, an initial candidate group with a smallest in-group average time skew is selected from initial candidate groups including the physical port as a candidate group of the physical port.

When a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

For example, for the physical port #1, it may be determined that there is only one initial candidate group including the physical port #1, and in this case, the initial candidate group 1 may act as a candidate group of the physical port #1.

For the physical port #2, for example, in the examples in S11, it may be determined that both the initial candidate groups 1 and 2 include the physical port #2. In-group time skews of the initial candidate group 1 are skew_1_2=150 ns and skew_1_3=260 ns. Therefore, an in-group average time skew of the initial candidate group 1 is 205 ns. An in-group time skew of the initial candidate group 2 is only skew_2_3=110 ns. Therefore, an in-group average time skew of the initial candidate group 2 is 110 ns. Because the in-group average time skew of the initial candidate group 2 is smaller than that of the initial candidate group 1, the initial candidate group 2 is determined as a candidate group of the physical port #2.

Optionally, if the in-group average time skew of the initial candidate group 1 is equal to that of the initial candidate group 2, an initial candidate group with a smaller initial candidate group number may be selected as a candidate group of the physical port #2. Optionally, a candidate group of a physical port may be determined between two initial candidate groups with a same in-group average time skew according to another principle, and this is not limited in this application.

For the physical port #3, for example, in the examples in S11, it may be determined that all of the initial candidate groups 1, 2, and 3 include the physical port #3. An in-group time skew of the initial candidate group 3 is only skew_3_4=250 ns. Therefore, an in-group average time skew of the initial candidate group 3 is 250 ns. Because the in-group average time skew of the initial candidate group 2 is smaller than that of the initial candidate group 1 and that of the initial candidate group 3, the initial candidate group 2 is determined as a candidate group of the physical port #3.

For the physical port #4, for example, in the examples in S11, it may be determined that both the initial candidate groups 3 and 4 include the physical port #4. In this case, because the initial candidate group 4 has only one member, an in-group average time skew of the initial candidate group 4 is 0. Therefore, the initial candidate group 4 is determined as a candidate group of the physical port #4.

To sum up, it may be determined that the M physical ports belong to three candidate groups. One candidate group includes the physical port #1, one candidate group includes the physical port #2 and the physical port #3, and the other candidate group includes the physical port #4.

Physical ports are grouped into candidate groups with time skews as small as possible according to a smallest in-group average time skew principle, to ensure that a link group functions properly.

Optionally, for the physical port #4, a candidate group of the physical port #4 may be alternatively determined in an initial candidate group whose in-group average time skew is not 0, that is, the initial candidate group 3 is determined as a candidate group of the physical port #4.

Optionally, a candidate group to which a physical port belongs may alternatively be determined by combining the foregoing solutions of determining a candidate group to which a physical port belongs, and this is not limited in this application.

S202. The first network device obtains, from a second network device, candidate groups to which M physical ports of the second network device belong respectively.

For example, the first network device further obtains, from the second network device, the candidate groups to which the M physical ports of the second network device belong respectively. It can be understood by a person skilled in the art that, the candidate groups to which the M physical ports of the second network device belong respectively satisfy a same time skew requirement as the candidate groups to which the M physical ports of the first network device belong respectively. In addition, a manner of obtaining the candidate groups to which the M physical ports of the second network device belong respectively may alternatively be the same as that of obtaining the candidate groups to which the M physical ports of the first network device belong respectively in S201, and details are not described in this embodiment again.

In addition, S201 and S202 may be performed simultaneously or sequentially, and there is no strict execution sequence between S201 and S202.

S203. Select N physical links from M physical links, as a link group between the first network device and the second network device, based on the candidate groups to which the M physical ports of the first network device belong respectively and the candidate groups to which the M physical ports of the second network device belong respectively.

N is an integer greater than 1.

For example, when distribution information of candidate groups of physical ports on both sides of physical links are obtained, N physical links may be determined based on the physical ports included in the candidate groups on both sides of the physical links, to form a link group. At least two physical links of the link group may be configured to implement a rate aggregation technology of flexible Ethernet.

Optionally, N physical ports, of the N physical links, that are located in the first network device belong to one candidate group, and N physical ports, of the N physical links, that are located in the second network device belong to one candidate group.

For example, because N physical ports, of N physical links, that are located on a same network device side all belong to one candidate group, it can be ensured that during data flow transmission through the N physical links, a time skew between a physical port fastest in receiving information and a physical port slowest in receiving information of the N physical ports in a link group that are located on the same network device side is within a time skew tolerance range of the physical port fastest in receiving information, thereby ensuring that the link group functions properly.

Optionally, a feasible method of selecting N physical links from M physical links, as a link group between the first network device and the second network device, based on the candidate groups to which the M physical ports of the first network device belong respectively and the candidate groups to which the M physical ports of the second network device belong respectively includes the following steps.

S21. Determine a first candidate group with a largest quantity of physical ports in the candidate groups to which the M physical ports of the first network device belong respectively, and determine a second candidate group with a largest quantity of physical ports in the candidate groups to which the M physical ports of the second network device belong respectively.

For example, the M physical ports on the first network device side belong to three candidate groups. One candidate group includes the physical port #1, one candidate group includes the physical port #2 and the physical port #3, and the other candidate group includes the physical port #4. The M physical ports on the second network device side belong to two candidate groups. One candidate group includes a physical port #1, and the other candidate group includes a physical port #2, a physical port #3, and a physical port #4. In this case, a first candidate group including the physical port #2 and the physical port #3 may be determined on the first network device side, and a second candidate group including the physical port #2, the physical port #3, and the physical port #4 may be determined on the second network device side.

S22. Select physical links whose physical ports at both ends belong to the first candidate group and the second candidate group respectively, as a link group between the first network device and the second network device.

For example, statistics collection is performed on physical ports, of the first candidate group and the second candidate group, that belong to a same physical link, or in other words, the physical port #2 and the physical port #3 on the first network device side, and the physical port #2 and the physical port #3 on the second network device side are determined. Therefore, physical links formed by the physical port #2 and the physical port #3 on the first network device side, and the physical port #2 and the physical port #3 on the second network device side may act as members of the link group.

Optionally, when there are a plurality of candidate groups with a largest quantity of physical ports on a network device side, a candidate group with a relatively small candidate group identifier may be selected as the first candidate group/the second candidate group.

Optionally, in S22, a plurality of candidate groups may alternatively be used as an alternative first candidate group/second candidate group, to select a link group. Optionally, when a plurality of link groups are determined, one of the plurality of link groups may be selected to implement a rate aggregation technology of flexible Ethernet.

Optionally, another feasible method of selecting N physical links from M physical links as a link group between the first network device and the second network device, based on the candidate groups to which the M physical ports of the first network device belong respectively and the candidate groups to which the M physical ports of the second network device belong respectively includes:

obtaining an intersection of the candidate groups on the first network device side and the candidate groups on the second network device side; and when there is an intersection including at least two physical ports, using a physical link to which the physical ports in the intersection belong as a member of the link group between the first network device and the second network device.

For example, the M physical ports on the first network device side belong to three candidate groups. One candidate group includes the physical port #1, one candidate group includes the physical port #2 and the physical port #3, and the other candidate group includes the physical port #4, and the three candidate groups are denoted as a set 11 (#1), a set 12 (#2 and #3), and a set 13 (#4). The M physical ports on the second network device side belong to two candidate groups. One candidate group includes the physical port #1, and the other candidate group includes the physical port #2, the physical port #3, and the physical port #4, and the two candidate groups are denoted as a set 21 (#1) and a set 22 (#2, #3, and #4). An intersection between each of the set 11, the set 12, and the set 13 on the first network device and each of the set 21 and the set 22 on the second network device side. For example, an intersection between the set 11 and each of the set 21 and the set 22 is calculated first, then an intersection between the set 12 and each of the set 21 and the set 22 is calculated, and finally an intersection between the set 13 and each of the set 21 and the set 22 is calculated. It may be determined that there is an intersection (#2 and #3) between the set 12 and the set 22. Therefore, two physical links between the physical port #2 and the physical port #3 of the first network device and the physical port #2 and the physical port #3 of the second network device may form a link group.

For example, physical ports at both ends of one physical link may use a same identifier, to facilitate determining of an intersection of sets on the two network device sides.

Optionally, the link group configuration method further includes the following steps.

S204. The first network device sends information about the link group between the first network device and the second network device to the second network device.

For example, after the first network device determines the link group, the first network device sends the information about the link group to the second network device, so that the second network device configures the link group based on the information about the link group.

The link group configuration method provided in this embodiment of this application includes: obtaining, by the first network device, candidate groups to which M physical ports of the first network device belong respectively; obtaining, by the first network device from the second network device, candidate groups to which M physical ports of the second network device belong respectively; and selecting N physical links from M physical links, as a link group between the first network device and the second network device, based on the candidate groups to which the M physical ports of the first network device belong respectively and the candidate groups to which the M physical ports of the second network device belong respectively. In this embodiment of this application, candidate groups are allocated to physical ports based on a speed at which each physical port receives information, and a link group is configured based on the candidate groups to which the physical ports belong respectively, so as to increase a link group configuration speed, ensuring reliable operation of the link group.

For example, this embodiment of this application further provides a link group configuration method. The first network device obtains information about a time at which each physical port of the first network device and the second network device receives information sent by a peer physical port of a physical link to which the physical port belongs, and configures a link group based on the time information.

For example, this embodiment of this application further provides a link group configuration method. The first network device obtains initial candidate group information of each physical port of the first network device and the second network device, and configures a link group based on the initial candidate group information.

Embodiment 2

Figure 3:
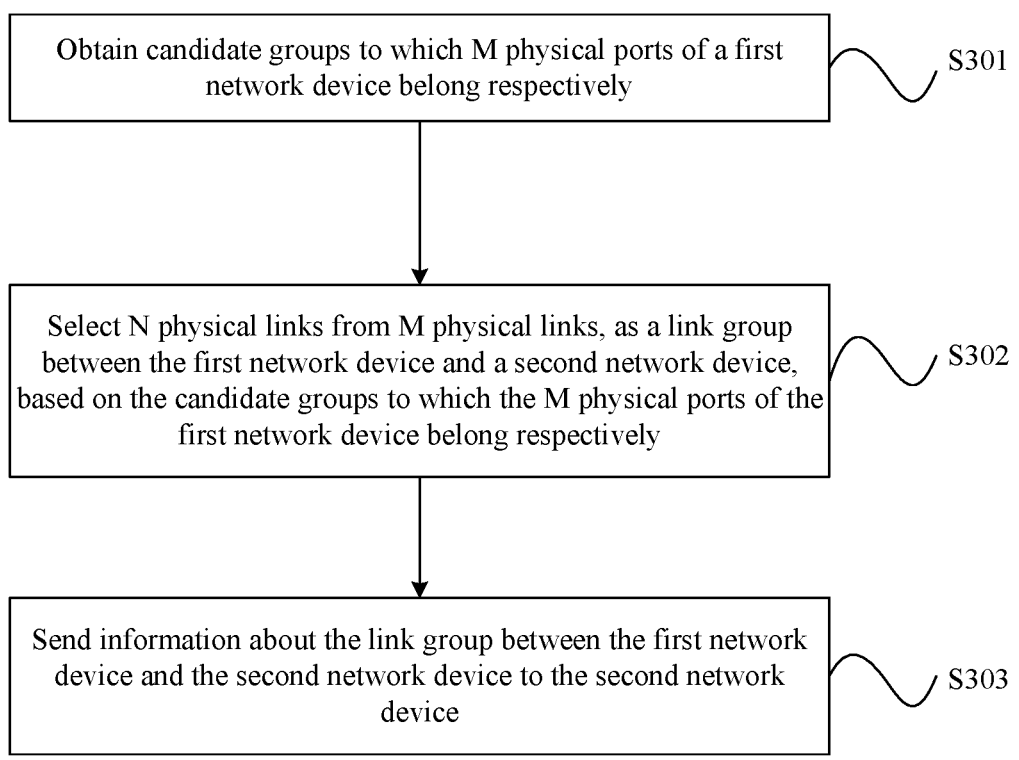
FIG. 3 is a schematic flowchart 2 of a link group configuration method according to an embodiment of this application.

Referring to the embodiment shown in FIG. 2, this embodiment of this application further provides a link group configuration method. In this embodiment, a first network device configures a link group based on candidate groups to which M physical ports of the first network device belong respectively. FIG. 3 is a schematic flowchart 2 of a link group configuration method according to an embodiment of this application. As shown in FIG. 3, the link group configuration method includes the following steps.

S301. Obtain candidate groups to which M physical ports of the first network device belong respectively.

For example, a specific implementation method of the obtaining candidate groups to which M physical ports of the first network device belong respectively may be the same as or similar to S201 in the embodiment shown in FIG. 2, and details are not described in this embodiment again.

S302. Select N physical links from M physical links, as a link group between the first network device and a second network device, based on the candidate groups to which the M physical ports of the first network device belong respectively.

N is an integer greater than 1.

For example, when the candidate groups to which the M physical ports of the first network device belong respectively are determined, physical links to which physical ports of a candidate group with a largest quantity of members may be used to form a link group. In this embodiment, considering that a manner of performing transmission and sending on one link is used in a data transmission process between the first network device and the second network device and a time for sending a data flow from the first network device side to the second network device side is same as a time for sending the data flow from the second network device side to the first network device side, to increase a link group configuration speed, a link group may be configured only based on information about an information reception time of a physical port on the first network device side.

S303. Send information about the link group between the first network device and the second network device to the second network device.

For example, after the first network device determines the link group, the first network device sends the information about the link group to the second network device, so that the second network device configures the link group based on the information about the link group.

The link group configuration method provided in this embodiment of this application includes: obtaining candidate groups to which M physical ports of the first network device belong respectively, and selecting N physical links from M physical links, as a link group between the first network device and the second network device, based on the candidate groups to which the M physical ports of the first network device belong respectively. In this embodiment of this application, the link group is configured only based on the information about the information reception time of the physical port on the first network device side, further increasing the link group configuration speed.

Embodiment 3

Figure 4:
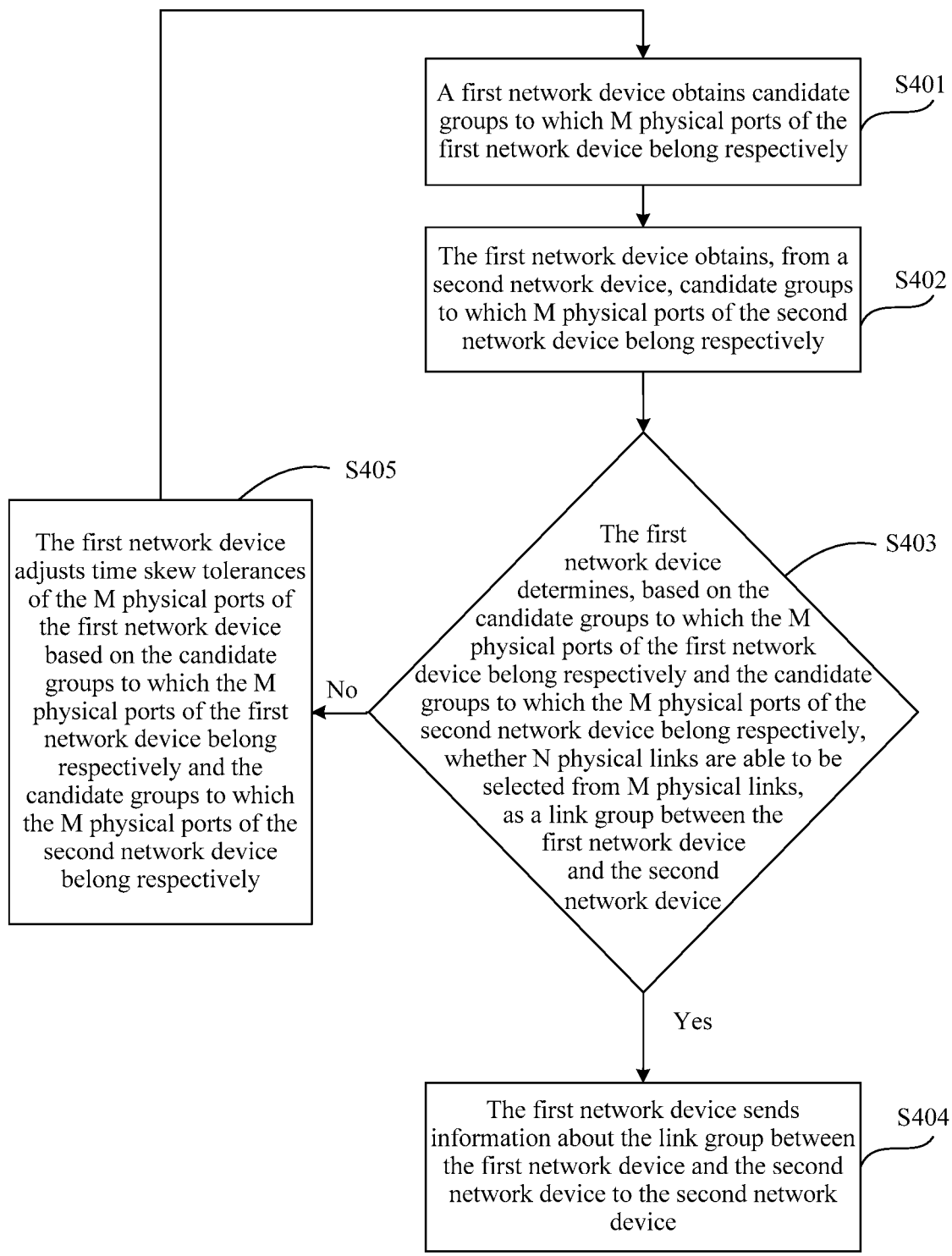
FIG. 4 is a schematic flowchart 3 of a link group configuration method according to an embodiment of this application.

For example, based on the embodiment shown in FIG. 2, during performing S203, there may be a case in which it is impossible to select N physical links from the M physical links, as a link group between the first network device and the second network device, based on the candidate groups to which the M physical ports of the first network device belong respectively and the candidate groups to which the M physical ports of the second network device belong respectively. To resolve this problem, this embodiment of this application further provides a link group configuration method. FIG. 4 is a schematic flowchart 3 of a link group configuration method according to an embodiment of this application. As shown in FIG. 4, the link group configuration method includes the following steps.

S401. A first network device obtains candidate groups to which M physical ports of the first network device belong respectively.

S402. The first network device obtains, from a second network device, candidate groups to which M physical ports of the second network device belong respectively.

S403. The first network device determines, based on the candidate groups to which the M physical ports of the first network device belong respectively and the candidate groups to which the M physical ports of the second network device belong respectively, whether N physical links are able to be selected from M physical links, as a link group between the first network device and the second network device; and if yes, S404 is performed; or if no, S405 is performed.

S404. The first network device sends information about the link group between the first network device and the second network device to the second network device.

For example, S401 to S404 are the same as or similar to S201 to S204 of the embodiment shown in FIG. 2. Details are not described again in this application.

S405. The first network device adjusts time skew tolerances of the M physical ports of the first network device based on the candidate groups to which the M physical ports of the first network device belong respectively and the candidate groups to which the M physical ports of the second network device belong respectively; and S401 is performed.

For example, according to the method of determining candidate groups to which physical ports belong, it can be learned that when a time skew tolerance of a physical port is relatively high, more physical ports may be grouped into one candidate group together with this physical port, thereby increasing a configuration success rate of a link group. Considering that a plurality of physical ports of one network device may share a time deskew buffer, more time deskew buffers are configured for some physical ports to increase time deskew tolerances of these physical ports, thereby increasing a configuration success possibility of a link group.

Optionally, the first network device may further choose to send time skew tolerance adjustment information to the second network device, so that the second network device adjusts time skew tolerances of the M physical ports of the second network device based on the time skew tolerance adjustment information.

Optionally, the time skew tolerance adjustment process specifically includes:

determining a first candidate group, on the $K^{th}$ network device side, including a largest quantity of physical ports, and allocating, to a physical port of the first candidate group, a time deskew buffer of a physical port not included in the first candidate group on the $K^{th}$ network device side, where the $K^{th}$ network device may be the first network device or the second network device.

For example, the first network device includes two candidate groups. A first candidate group includes a physical port #1, a physical port #2, and a physical port #3, and a second candidate group includes a physical port #4. A member quantity of the first candidate group is larger than that of the second candidate group. In this case, a time deskew buffer of the physical port #4 may be allocated to the physical port #1, the physical port #2, and the physical port #3. Specifically, the time deskew buffer of the physical port #4 may be equally allocated to the physical port #1, the physical port #2, and the physical port #3. The time deskew buffer of the physical port #4 may alternatively be allocated to a physical port in the first candidate group fastest in receiving information. The time deskew buffer of the physical port #4 may alternatively be allocated to the physical ports in the first candidate group based on weights. Weights of the physical ports in the first candidate group depend on information reception speeds of the physical ports. A higher speed leads to a larger weight and a larger configured time deskew buffer.

Optionally, one or more physical ports may be arbitrarily selected from the M physical ports, and time deskew buffers of these physical ports may be allocated to remaining physical ports. Optionally, a physical port in the M physical ports that has a largest time skew with remaining physical ports is determined, and a time deskew buffer of the physical port is allocated to the remaining physical ports.

For example, when there is a physical port in the M physical ports that is obviously faster or slower in receiving information than another physical port, a time skew between the physical port and a remaining physical port is the largest. Therefore, a time deskew buffer of the physical port may be allocated to other physical ports. In this way, to obtain new candidate groups of the physical ports, the physical port may independently act as a candidate group, and the other physical ports may be concentrated as a candidate group, so as to increase a link group configuration success rate.

Optionally, time skew tolerances of the M physical ports of the $K^{th}$ network device may be adjusted before S401 is performed.

In the link group configuration method provided in this embodiment of this application, the link group configuration success rate is increased by re-configuring time deskew buffers for the physical ports.

Embodiment 4

Figure 5:
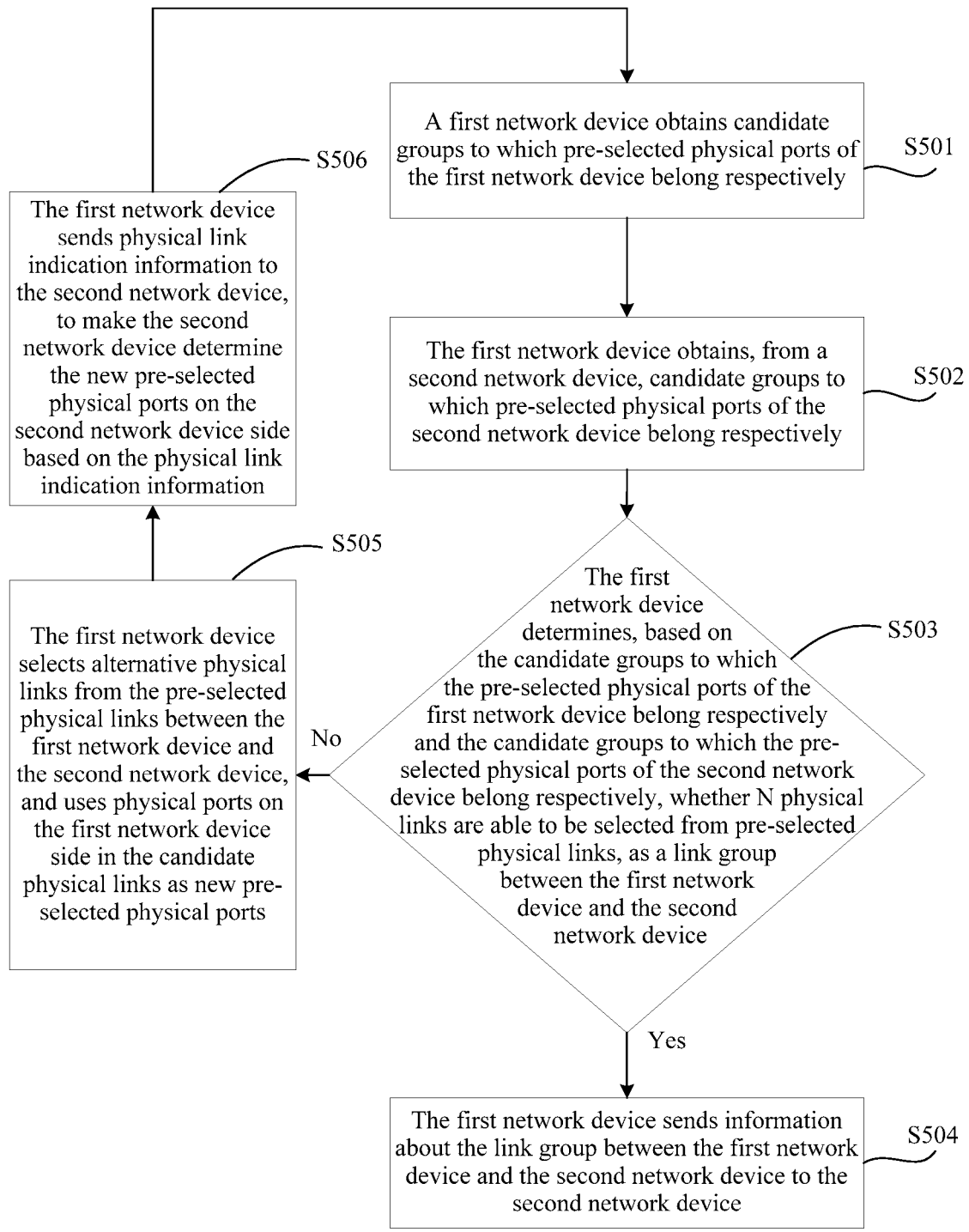
FIG. 5 is a schematic flowchart 4 of a link group configuration method according to an embodiment of this application.

For example, based on the embodiment shown in FIG. 2, during performing S203, there may be a case in which it is impossible to select N physical links from the M physical links, as a link group between the first network device and the second network device, based on the candidate groups to which the M physical ports of the first network device belong respectively and the candidate groups to which the M physical ports of the second network device belong respectively. To resolve this problem, this embodiment of this application further provides a link group configuration method. FIG. 5 is a schematic flowchart 4 of a link group configuration method according to an embodiment of this application. As shown in FIG. 5, the link group configuration method includes the following steps.

S501. A first network device obtains candidate groups to which pre-selected physical ports of the first network device belong respectively.

For example, the pre-selected physical ports of the first network device may be the M physical ports of the first network device in the foregoing embodiments.

S502. The first network device obtains, from a second network device, candidate groups to which pre-selected physical ports of the second network device belong respectively.

For example, the pre-selected physical ports of the second network device may be the M physical ports of the second network device in the foregoing embodiments. The pre-selected physical ports of the first network device are connected to the pre-selected physical ports of the second network device in a one-to-one correspondence, to form pre-selected physical links.

S503. The first network device determines, based on the candidate groups to which the pre-selected physical ports of the first network device belong respectively and the candidate groups to which the pre-selected physical ports of the second network device belong respectively, whether N physical links are able to be selected from pre-selected physical links, as a link group between the first network device and the second network device; and if yes, S504 is performed; or if no, S505 is performed.

N is greater than 1, and is not greater than an integer quantity of pre-selected physical ports.

S504. The first network device sends information about the link group between the first network device and the second network device to the second network device.

For example, S501 to S504 are the same as or similar to S201 to S204 of the embodiment shown in FIG. 2. Details are not described again in this application.

S505. The first network device selects alternative physical links from the pre-selected physical links between the first network device and the second network device, and uses physical ports on the first network device side in the alternative physical links as new pre-selected physical ports.

A quantity of the alternative physical links is smaller than that of the pre-selected physical links, and the quantity of the alternative physical links is greater than 1.

S506. The first network device sends physical link indication information to the second network device, so that the second network device determines new pre-selected physical ports on the second network device side based on the physical link indication information; and S501 is performed.

For example, according to the method of determining candidate groups to which physical ports belong in the foregoing embodiments, it can be learned that, there may be a physical port obviously faster or slower in receiving information than another physical port, a time skew between the two physical ports is relatively large. Therefore, the physical port may be directly deleted from the pre-selected physical ports, to decrease time skews between the physical ports in the pre-selected physical ports to concentrate the pre-selected physical port as one candidate group, thereby increasing a link group configuration success rate. For example, the physical port to be deleted may be determined by calculating an average time skew value of each physical port on the first network device side or the second network device side. Specifically, the average time skew value of each physical port may be obtained based on average values of time skews between the physical port and all other physical ports.

Optionally, the physical link indication information carries information about alternative physical links or information about a physical link deleted from the pre-selected physical links.

Optionally, a deleted physical link may be randomly selected from the pre-selected physical links.

Optionally, at least one physical link may be deleted from the pre-selected physical links.

In the link group configuration method provided in this embodiment of this application, the link group configuration success rate is increased by decreasing a pre-selected physical link.

Embodiment 5

Figure 6:
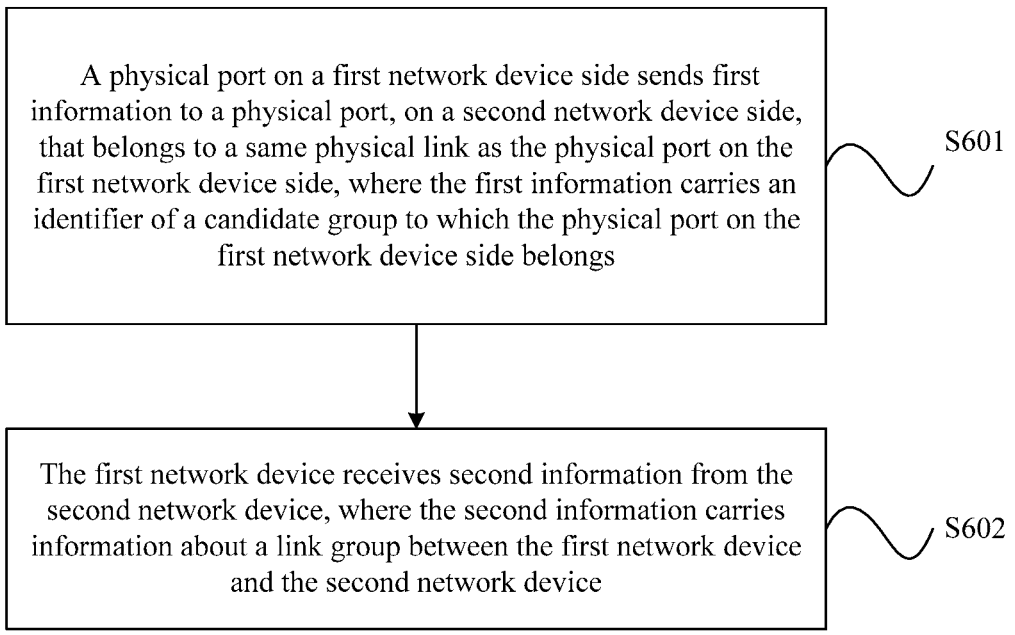
FIG. 6 is a schematic flowchart 5 of a link group configuration method according to an embodiment of this application.

This embodiment of this application further provides a link group configuration method. FIG. 6 is a schematic flowchart 5 of a link group configuration method according to an embodiment of this application. As shown in FIG. 6, the link group configuration method includes the following steps.

S601. A physical port on a first network device side sends first information to a physical port, on a second network device side, that belongs to a same physical link as the physical port on the first network device side, where the first information carries an identifier of a candidate group to which the physical port on the first network device side belongs.

S602. The first network device receives second information from the second network device, where the second information carries information about a link group between the first network device and the second network device.

A time skew between two physical ports that belong to one candidate group is not greater than a time skew tolerance of a physical port in the candidate group fastest in receiving information sent by a peer port of a physical link, and a time skew tolerance of a physical port in the two physical ports that is faster in receiving information sent by a peer port of a physical link.

For example, when the first network device sends information about candidate groups of physical ports of the first network device to the second network device, the information is sent, through physical links to which the physical ports belong, to physical ports of the second network device respectively.

Optionally, the first information further includes an identifier of the physical port on the first network device side.

In this embodiment of this application, candidate groups are allocated to physical ports based on a speed at which each physical port receives information, and a link group is configured based on the candidate groups to which the physical ports belong respectively, so as to increase a link group configuration speed, ensuring reliable operation of the link group.

Optionally, the first information uses a link layer discovery protocol LLDP format.

Optionally, the first information is sent on a segment management channel of a flexible Ethernet overhead frame.

Optionally, the first information further includes time skew tolerance information of the physical port or a maximum time skew and a minimum time skew of a candidate group to which the physical port belongs, where the maximum time skew is an information reception time skew between a fastest physical port in the candidate group and a slowest physical port in the candidate group; the fastest physical port in the candidate group is a physical port in the candidate group fastest in receiving information sent by a peer physical port of a physical link; and the slowest physical port in the candidate group is a physical port in the candidate group slowest in receiving information sent by a peer physical port of a physical link; and the minimum time skew is an information reception time skew between the slowest physical port in the candidate group and a second slowest physical port in the candidate group; and the second slowest physical port in the candidate group is a physical port in the candidate group second slowest in receiving information sent by a peer physical port of a physical link.

Another aspect of this embodiment of this application further provides a link group configuration apparatus. The link group configuration apparatus is configured to perform the link group configuration methods of the embodiments shown in FIG. 2 to FIG. 6, and the link group configuration apparatus has technical characteristics and technical effects the same as or similar to those of the link group configuration methods.

Figure 7:
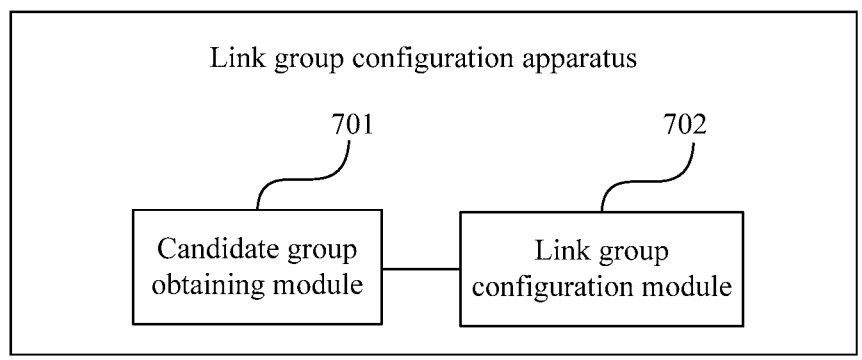
FIG. 7 is a schematic structural diagram 1 of a link group configuration apparatus according to an embodiment of this application.

FIG. 7 is a schematic structural diagram 1 of a link group configuration apparatus according to an embodiment of this application. As shown in FIG. 7, the link group configuration apparatus includes:

a candidate group obtaining module 701, configured to obtain candidate groups to which M physical ports of a first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and a link group configuration module 702, configured to select N physical links from the M physical links, as a link group between the first network device and the second network device, based on the candidate groups to which the M physical ports of the first network device belong respectively, where N is an integer greater than 1.

Optionally, the candidate group obtaining module 701 is further configured to obtain candidate groups to which the M physical ports of the second network device belong respectively.

The link group configuration module 702 is specifically configured to select the N physical links from the M physical links, as the link group between the first network device and the second network device, based on the candidate groups to which the M physical ports of the first network device belong respectively and the candidate groups to which the M physical ports of the second network device belong respectively.

Optionally, N physical ports, of the N physical links, that are located in the first network device belong to one candidate group, and N physical ports, of the N physical links, that are located in the second network device belong to one candidate group.

Optionally, the link group configuration module 702 is specifically configured to:

determine a first candidate group with a largest quantity of physical ports in the candidate groups to which the M physical ports of the first network device belong respectively, and determine a second candidate group with a largest quantity of physical ports in the candidate groups to which the M physical ports of the second network device belong respectively; and select physical links whose physical ports at both ends belong to the first candidate group and the second candidate group respectively, as a link group between the first network device and the second network device.

Figure 8:
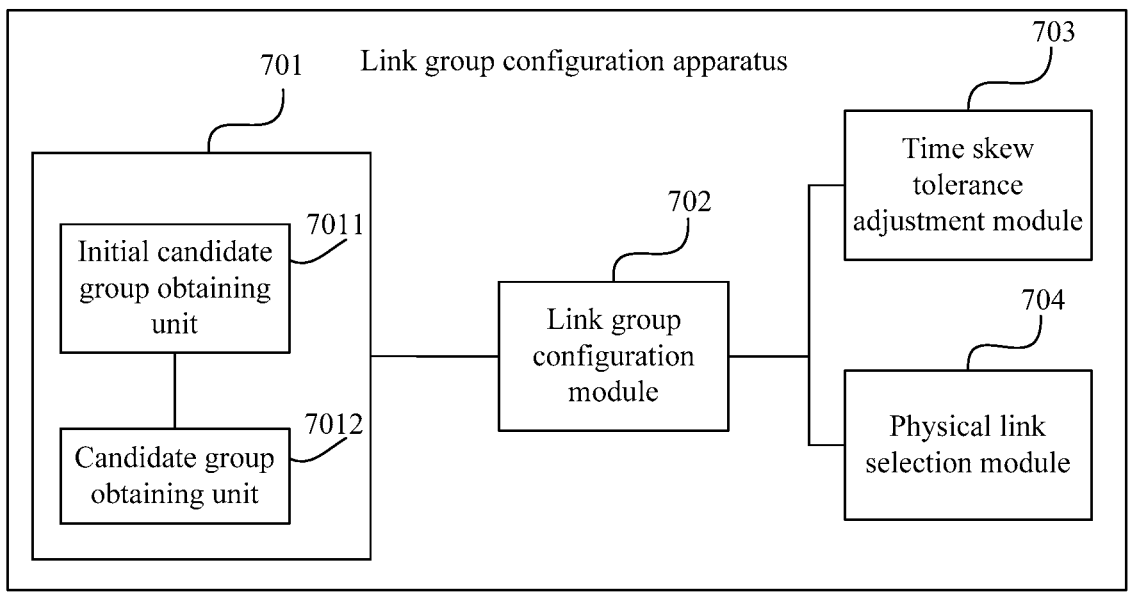
FIG. 8 is a schematic structural diagram 2 of a link group configuration apparatus according to an embodiment of this application.

Optionally, based on the embodiment shown in FIG. 7, FIG. 8 is a schematic structural diagram 2 of a link group configuration apparatus according to an embodiment of this application. As shown in FIG. 8, the candidate group obtaining module 701 includes an initial candidate group obtaining unit 7011 and a candidate group obtaining unit 7012.

The initial candidate group obtaining unit 7011 is configured to obtain initial candidate group members of each of the M physical ports of the $K^{th}$ network device; and the candidate group obtaining unit 7012 is configured to obtain the candidate groups to which the M physical ports belong respectively, based on the initial candidate group members of each of the M physical ports, where the $K^{th}$ network device is the first network device or the second network device.

Optionally, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

Optionally, the candidate group obtaining unit 7012 is specifically configured to:

for any physical port, select an initial candidate group with a largest quantity of members from initial candidate groups including the physical port, as a candidate group of the physical port.

Optionally, the candidate group obtaining unit 7012 is specifically configured to:

for any physical port, select an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

Optionally, the candidate group obtaining unit 7012 is specifically configured to:

for any physical port, select an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

Optionally, as shown in FIG. 8, if it is impossible to select N physical links from the M physical links, as a link group between the first network device and the second network device, based on the candidate groups to which the M physical ports of the first network device belong respectively and the candidate groups to which the M physical ports of the second network device belong respectively, the link group configuration apparatus further includes:

a time skew tolerance adjustment module 703, configured to adjust time skew tolerances of the M physical ports of the first network device and the M physical ports of the second network device, based on the candidate groups to which the M physical ports of the first network device belong respectively and the candidate groups to which the M physical ports of the second network device belong respectively.

Optionally, the time skew tolerance adjustment module 703 is specifically configured to:

determine a first candidate group, on the $K^{th}$ network device side, including a largest quantity of physical ports, and allocate, to a physical port of the first candidate group, a time deskew buffer of a physical port not included in the first candidate group on the $K^{th}$ network device side, where the $K^{th}$ network device is the first network device or the second network device.

Optionally, as shown in FIG. 8, the link group configuration apparatus further includes:

a time skew tolerance adjustment module 703, configured to adjust time skew tolerances of the M physical ports of the $K^{th}$ network device before initial candidate group members of each of the M physical ports of the $K^{th}$ network device are obtained.

Figure 9:
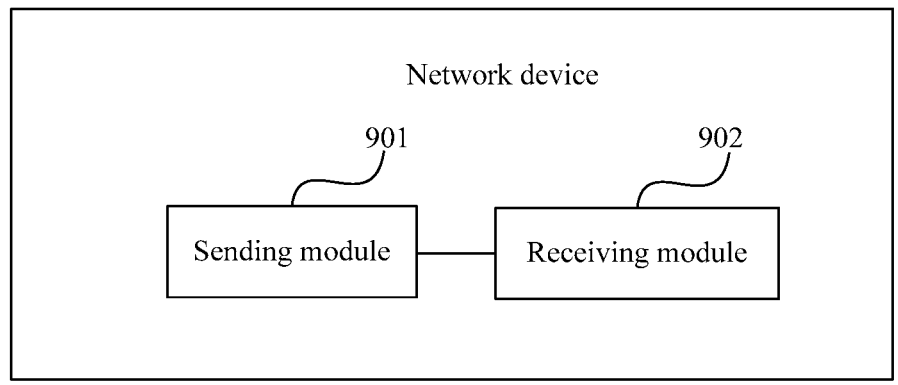
FIG. 9 is a schematic structural diagram 1 of a network device according to an embodiment of this application.

Optionally, as shown in FIG. 9, if it is impossible to select N physical links from the M physical links, as a link group between the first network device and the second network device, based on the candidate groups to which the M physical ports of the first network device belong respectively and the candidate groups to which the M physical ports of the second network device belong respectively, the link group configuration apparatus further includes: a physical link selection module 704, configured to:

select M−1 physical links from the M physical links between the first network device and the second network device, where M is an integer greater than 2.

Another aspect of this embodiment of this application further provides a network device. FIG. 9 is a schematic structural diagram 1 of a network device according to an embodiment of this application. As shown in FIG. 9, the network device includes:

a sending module 901, configured to send, to a link group configuration device, information about candidate groups to which M physical ports of the first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and a receiving module 902, configured to receive information, about a link group between the first network device and the second network device, sent by the link group configuration device.

Figure 10:
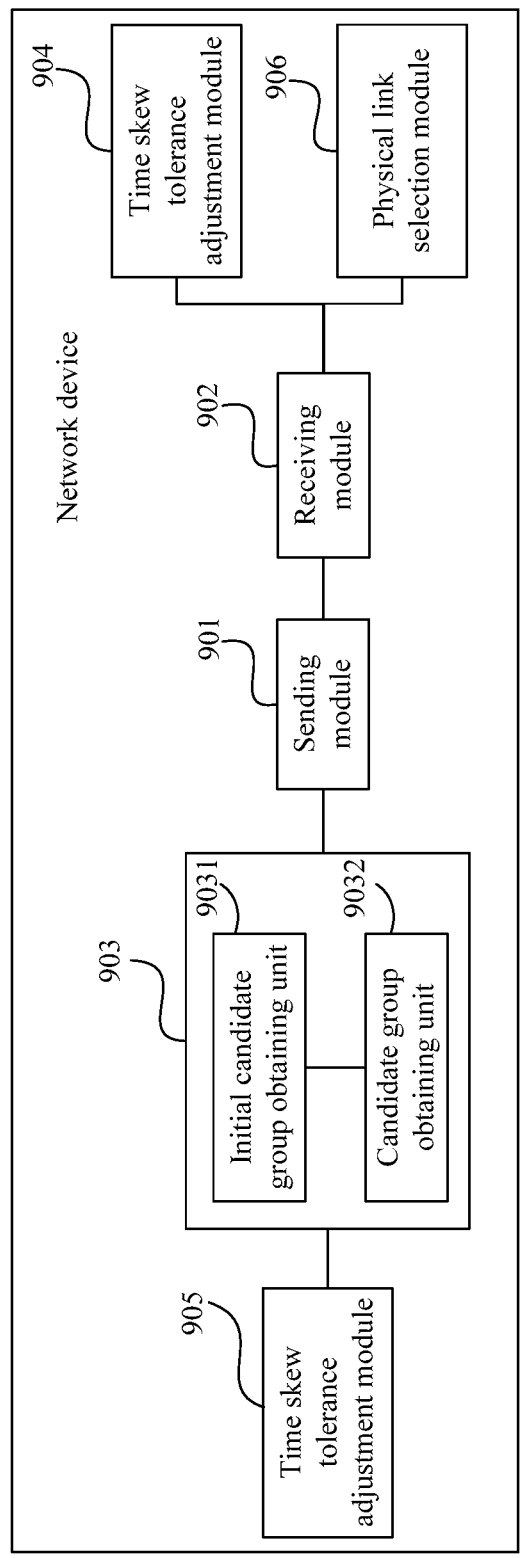
FIG. 10 is a schematic structural diagram 2 of a network device according to an embodiment of this application.

Optionally, based on the embodiment shown in FIG. 9, FIG. 10 is a schematic structural diagram 2 of a network device according to an embodiment of this application. As shown in FIG. 10, the first network device further includes a candidate group obtaining module 903, where the candidate group obtaining module 903 includes an initial candidate group obtaining unit 9031 and a candidate group obtaining unit 9032, where the initial candidate group obtaining unit 9031 is configured to obtain initial candidate group members of each of the M physical ports of the first network device; and the candidate group obtaining unit 9032 is configured to obtain the candidate groups to which the M physical ports belong respectively, based on the initial candidate group members of each of the M physical ports.

Optionally, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

Optionally, the candidate group obtaining unit 9032 is specifically configured to:

for any physical port, select, by the first network device, an initial candidate group with a largest quantity of members from initial candidate groups including the physical port, as a candidate group of the physical port.

Optionally, the candidate group obtaining unit 9032 is specifically configured to:

for any physical port, select, by the first network device, an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

Optionally, the candidate group obtaining unit 9032 is specifically configured to:

for any physical port, select, by the first network device, an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

Optionally, as shown in FIG. 10, the receiving module 902 is further configured to receive time skew tolerance adjustment information sent by the link group configuration device.

The first network device further includes a time skew tolerance adjustment module 904, configured to adjust time skew tolerances of the M physical ports of the first network device based on the time skew tolerance adjustment information.

The candidate group obtaining module 903 is further configured to obtain information about new candidate groups to which the M physical ports of the first network device belong respectively, based on adjusted time skew tolerances of the M physical ports of the first network device.

The sending module 901 is further configured to send, to the link group configuration device, the information about the new candidate groups to which the M physical ports of the first network device belong respectively.

The receiving module 902 is further configured to receive information, about a link group between the first network device and the second network device, sent by the link group configuration device.

Optionally, as shown in FIG. 10, the first network device further includes a time skew tolerance adjustment module 905.

The time skew tolerance adjustment module 905 is configured to adjust time skew tolerances of the M physical ports of the first network device before the information about the candidate groups to which the M physical ports of the first network device belong respectively is sent to the link group configuration device.

Optionally, the receiving module 902 is further configured to receive physical link indication information sent by the link group configuration device.

As shown in FIG. 10, the first network device further includes a physical link selection module 906.

The physical link selection module 906 is configured to determine M−1 physical ports in the M physical ports based on the physical link indication information.

The candidate group obtaining module 903 is further configured to obtain information about new candidate groups to which the M−1 physical ports belong respectively.

The sending module 901 is further configured to send, to the link group configuration device, the information about the new candidate groups to which the M−1 physical ports belong respectively.

The receiving module 902 is further configured to receive information, about a link group between the first network device and the second network device, sent by the link group configuration device.

According to a sixth aspect, this application further provides a network device as a first network device. As shown in FIG. 9, the network device includes:

a sending module 901, configured to send, through a physical port on a first network device side, first information to a physical port, on a second network device side, that belongs to a same physical link as the physical port on the first network device side, where the first information carries an identifier of a candidate group to which the physical port on the first network device side belongs; and a receiving module 902, configured to receive second information from the second network device, where the second information carries information about a link group between the first network device and the second network device, where a time skew between two physical ports that belong to one candidate group is not greater than a time skew tolerance of a physical port in the candidate group fastest in receiving information sent by a peer port of a physical link, and a time skew tolerance of a physical port in the two physical ports that is faster in receiving information sent by a peer port of a physical link.

Optionally, the first information uses a link layer discovery protocol (Link Layer Discovery Protocol, LLDP) format.

Optionally, the first information is sent on a segment management channel of a flexible Ethernet overhead frame.

Optionally, the first information further includes time skew tolerance information of the physical port or a maximum time skew and a minimum time skew of a candidate group to which the physical port belongs, where the maximum time skew is an information reception time skew between a fastest physical port in the candidate group and a slowest physical port in the candidate group; the fastest physical port in the candidate group is a physical port in the candidate group fastest in receiving information sent by a peer physical port of a physical link; and the slowest physical port in the candidate group is a physical port in the candidate group slowest in receiving information sent by a peer physical port of a physical link; and the minimum time skew is an information reception time skew between a second slowest physical port in the candidate group and the slowest physical port in the candidate group; and the second slowest physical port in the candidate group is a physical port in the candidate group second slowest in receiving information sent by a peer physical port of a physical link.

Optionally, the first information further includes an identifier of the physical port on the first network device side.

Figure 11:
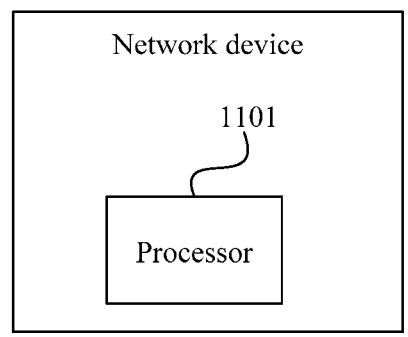
FIG. 11 is a schematic structural diagram 3 of a network device according to an embodiment of this application.

Another aspect of this embodiment of this application further provides a network device. FIG. 11 is a schematic structural diagram 3 of a network device according to an embodiment of this application. As shown in FIG. 11, the network device includes:

a processor 1101, configured to obtain candidate groups to which M physical ports of a first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1.

The processor 1101 is further configured to select N physical links from the M physical links, as a link group between the first network device and the second network device, based on the candidate groups to which the M physical ports of the first network device belong respectively, where N is an integer greater than 1.

Optionally, the processor 1101 is further configured to obtain candidate groups to which the M physical ports of the second network device belong respectively.

The processor 1101 is further configured to select the N physical links from the M physical links, as the link group between the first network device and the second network device, based on the candidate groups to which the M physical ports of the first network device belong respectively and the candidate groups to which the M physical ports of the second network device belong respectively.

Optionally, N physical ports, of the N physical links, that are located in the first network device belong to one candidate group, and N physical ports, of the N physical links, that are located in the second network device belong to one candidate group.

Optionally, the processor 1101 is further configured to:

determine a first candidate group with a largest quantity of physical ports in the candidate groups to which the M physical ports of the first network device belong respectively, and determine a second candidate group with a largest quantity of physical ports in the candidate groups to which the M physical ports of the second network device belong respectively; and select physical links whose physical ports at both ends belong to the first candidate group and the second candidate group respectively, as a link group between the first network device and the second network device.

Optionally, the processor 1101 is further configured to:

obtain initial candidate group members of each of the M physical ports of the $K^{th}$ network device; and obtain the candidate groups to which the M physical ports belong respectively, based on the initial candidate group members of each of the M physical ports, where the $K^{th}$ network device is the first network device or the second network device.

Optionally, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

Optionally, the processor 1101 is specifically configured to:

for any physical port, select an initial candidate group with a largest quantity of members from initial candidate groups including the physical port, as a candidate group of the physical port.

Optionally, the processor 1101 is specifically configured to: for any physical port, select an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

Optionally, the processor 1101 is specifically configured to: for any physical port, select an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

Optionally, if it is impossible to select N physical links from the M physical links, as a link group between the first network device and the second network device, based on the candidate groups to which the M physical ports of the first network device belong respectively and the candidate groups to which the M physical ports of the second network device belong respectively.

The processor 1101 is further configured to adjust time skew tolerances of the M physical ports of the first network device and the M physical ports of the second network device, based on the candidate groups to which the M physical ports of the first network device belong respectively and the candidate groups to which the M physical ports of the second network device belong respectively.

Optionally, the processor 1101 is specifically configured to:

determine a first candidate group, on the $K^{th}$ network device side, including a largest quantity of physical ports, and allocate, to a physical port of the first candidate group, a time deskew buffer of a physical port not included in the first candidate group on the $K^{th}$ network device side, where the $K^{th}$ network device is the first network device or the second network device.

Optionally, the processor 1101 is further configured to adjust time skew tolerances of the M physical ports of the $K^{th}$ network device before the initial candidate group members of each of the M physical ports of the $K^{th}$ network device are obtained.

Optionally, if it is impossible to select N physical links from the M physical links, as a link group between the first network device and the second network device, based on the candidate groups to which the M physical ports of the first network device belong respectively and the candidate groups to which the M physical ports of the second network device belong respectively, the processor 1101 is further configured to:

select M−1 physical links from the M physical links between the first network device and the second network device, where M is an integer greater than 2.

It can be understood that, FIG. 11 shows only a simplified design of the network device. In another implementation, the network device may further include any quantity of transceivers, any quantity of processors, any quantity of memories, and/or any quantity of communications units, and the like, and this not limited in this embodiment of this application.

Figure 12:
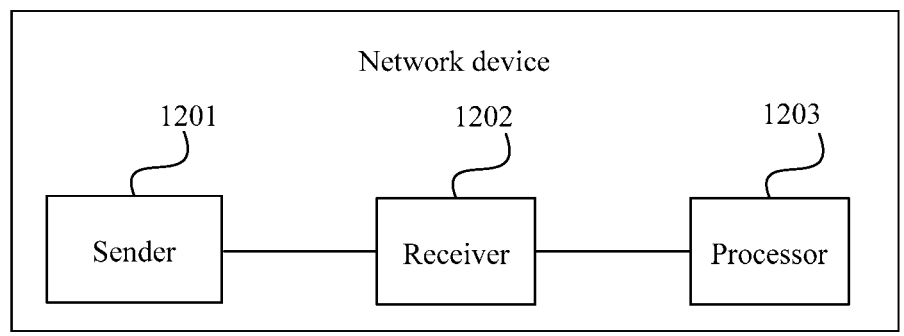
FIG. 12 is a schematic structural diagram 4 of a network device according to an embodiment of this application.

According to another aspect, this embodiment of this application further provides a network device as a first network device. FIG. 12 is a schematic structural diagram 4 of a network device according to an embodiment of this application. As shown in FIG. 12, the network device includes:

a sender 1201, configured to send, to a link group configuration device, information about candidate groups to which M physical ports of the first network device belong respectively, where the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, where M is an integer greater than 1, and i is an integer ranging from 1 to I−1; and a receiver 1202, configured to receive information, about a link group between the first network device and the second network device, sent by the link group configuration device.

Optionally, as shown in FIG. 12, the first network device further includes a processor 1203.

The processor 1203 is configured to obtain initial candidate group members of each of the M physical ports of the first network device; and obtain the candidate groups to which the M physical ports belong respectively, based on the initial candidate group members of each of the M physical ports.

Optionally, initial candidate group members of any physical port of the M physical ports include: a physical port in the M physical ports that is a first-type physical port, where the first-type physical port receives information sent by a peer physical port of a physical link not faster than the physical port, and an information reception time skew between the first-type physical port and the physical port is not greater than a time skew tolerance of the physical port.

Optionally, the processor 1203 is specifically configured to:

for any physical port, select, by the first network device, an initial candidate group with a largest quantity of members from initial candidate groups including the physical port, as a candidate group of the physical port.

Optionally, the processor 1203 is specifically configured to:

for any physical port, select, by the first network device, an initial candidate group with a smallest in-group maximum time skew from initial candidate groups including the physical port, as a candidate group of the physical port, where the in-group maximum time skew is an information reception time skew between a fastest physical port in the initial candidate group and a slowest physical port in the initial candidate group; the fastest physical port in the initial candidate group is a physical port in the initial candidate group fastest in receiving information sent by a peer physical port of a physical link; and the slowest physical port in the initial candidate group is a physical port in the initial candidate group slowest in receiving information sent by a peer physical port of a physical link.

Optionally, the processor 1203 is specifically configured to:

for any physical port, select, by the first network device, an initial candidate group with a smallest in-group average time skew from initial candidate groups including the physical port, as a candidate group of the physical port, where when a member quantity J of an initial candidate group is greater than 1, the in-group average time skew is an average value of information reception time skews between J−1 physical ports in the initial candidate group other than a physical port fastest in receiving information sent by a peer physical port of a physical link and the fastest physical port.

Optionally, the receiver 1202 is further configured to receive time skew tolerance adjustment information sent by the link group configuration device.

The processor 1203 is further configured to adjust time skew tolerances of the M physical ports of the first network device based on the time skew tolerance adjustment information.

The processor 1203 is further configured to obtain information about new candidate groups to which the M physical ports of the first network device belong respectively, based on adjusted time skew tolerances of the M physical ports of the first network device.

The sender 1201 is further configured to send, to the link group configuration device, the information about the candidate groups to which the M physical ports of the first network device belong respectively.

The receiver 1202 is further configured to receive information, about a link group between the first network device and the second network device, sent by the link group configuration device.

Optionally, the processor 1203 is further configured to adjust time skew tolerances of the M physical ports of the first network device before the information about the candidate groups to which the M physical ports of the first network device belong respectively is sent to the link group configuration device.

Optionally, the receiver 1203 is further configured to receive physical link indication information sent by the link group configuration device.

The processor 1203 is further configured to determine M−1 physical ports in the M physical ports based on the physical link indication information; and obtain information about new candidate groups to which the M−1 physical ports belong respectively.

The sender 1201 is further configured to send, to the link group configuration device, the information about the new candidate groups to which the M−1 physical ports belong respectively.

The receiver 1202 is further configured to receive information, about a link group between the first network device and the second network device, sent by the link group configuration device.

Figure 13:
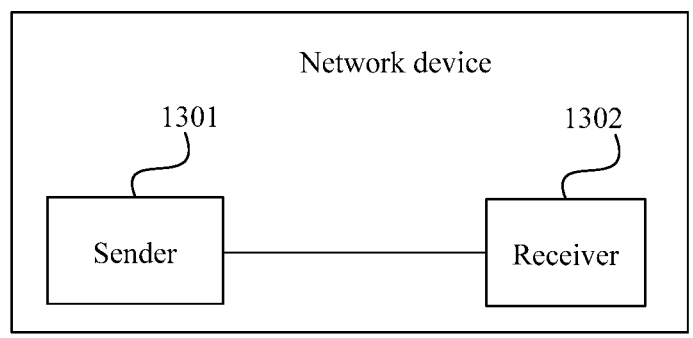
FIG. 13 is a schematic structural diagram 5 of a network device according to an embodiment of this application.

According to another aspect, this application further provides a network device as a first network device. FIG. 13 is a schematic structural diagram 5 of a network device according to an embodiment of this application. As shown in FIG. 13, the network device includes:

a sender 1301, configured to send, through a physical port on a first network device side, first information to a physical port, on a second network device side, that belongs to a same physical link as the physical port on the first network device side, where the first information carries an identifier of a candidate group to which the physical port on the first network device side belongs; and a receiver 1302, configured to receive second information from the second network device, where the second information carries information about a link group between the first network device and the second network device, where a time skew between two physical ports that belong to one candidate group is not greater than a time skew tolerance of a physical port in the candidate group fastest in receiving information sent by a peer port of a physical link, and a time skew tolerance of a physical port in the two physical ports that is faster in receiving information sent by a peer port of a physical link.

Optionally, the first information uses a link layer discovery protocol (Link Layer Discovery Protocol, LLDP) format.

Optionally, the first information is sent on a segment management channel of a flexible Ethernet overhead frame.

Optionally, the first information further includes time skew tolerance information of the physical port or a maximum time skew and a minimum time skew of a candidate group to which the physical port belongs, where the maximum time skew is an information reception time skew between a fastest physical port in the candidate group and a slowest physical port in the candidate group; the fastest physical port in the candidate group is a physical port in the candidate group fastest in receiving information sent by a peer physical port of a physical link; and the slowest physical port in the candidate group is a physical port in the candidate group slowest in receiving information sent by a peer physical port of a physical link; and the minimum time skew is an information reception time skew between a second slowest physical port in the candidate group and the slowest physical port in the candidate group; and the second slowest physical port in the candidate group is a physical port in the candidate group second slowest in receiving information sent by a peer physical port of a physical link.

Optionally, the first information further includes an identifier of the physical port on the first network device side.

Figure 14:
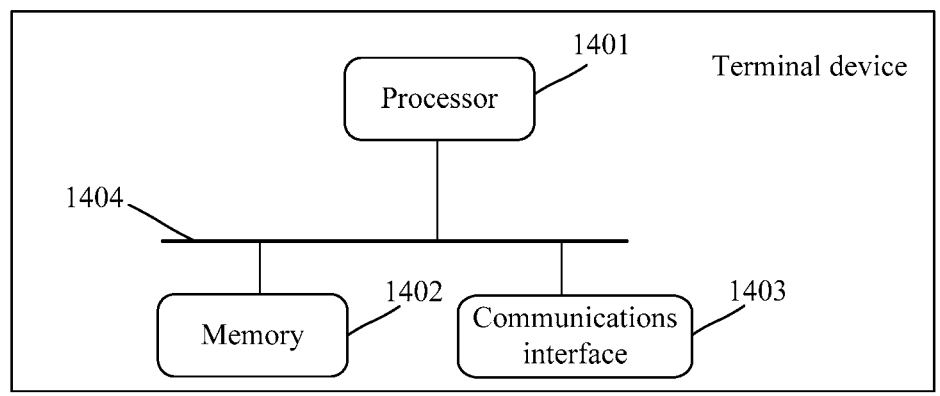
FIG. 14 is a schematic structural diagram 6 of a network device according to an embodiment of this application.

Still another aspect of this embodiment of this application further provides a network device. FIG. 14 is a schematic structural diagram 6 of a network device according to an embodiment of this application. As shown in FIG. 14, the network device includes a processor 1401, a memory 1402, a communications interface 1403, and a bus 1404.

The processor 1401, the memory 1402, and the communications interface 1403 are connected and implement communication with each other through the bus 1404. The memory 1402 is configured to store a computer executable instruction. When the device runs, the processor 1401 executes the computer executable instruction stored in the memory 1402, to perform, by using a hardware resource of the device, the steps of the link group configuration methods corresponding to FIG. 2 to FIG. 6.

Still another aspect of this embodiment of this application further provides a network device, including a memory, a processor, and a computer program, where the computer program is stored in the memory, and the processor runs the computer program to perform the link group configuration methods in the embodiments shown in FIG. 2 to FIG. 6.

Still another aspect of this embodiment of this application further provides a computer storage medium, where the storage medium includes a computer program, and the computer program is used to perform the link group configuration methods in the embodiments shown in FIG. 2 to FIG. 6.

Still another aspect of this embodiment of this application further provides a computer program product, where the computer program product includes computer program code. When the computer program code is run on a computer, the computer is enabled to perform the link group configuration methods in the embodiments shown in FIG. 2 to FIG. 6.

Still another aspect of this embodiment of this application further provides a chip, including a memory and a processor, where the memory is configured to store a computer program, and the processor is configured to invoke the computer program from the memory and run the computer program to enable a network device provided with the chip to perform the link group configuration methods in the embodiments shown in FIG. 2 to FIG. 6.

In the embodiments of this application, an execution body of the network device side method may be a network device, or may be an apparatus in the network device (it should be noted that, in the embodiments provided in this application, description is provided by using an example in which the execution body is a network device). For example, the apparatus in the network device may be a chip system, circuit, module, or the like. This is not limited in this application.

In this application, "at least one" means one or more, and "a plurality of" means two or more than two. "And/Or" describes an association relationship for describing associated objects, and represents that three relationships may exist. For example, A and/or B may represent the following three cases: Only A exists, both A and B exist, and only B exists, where there may be one or more A and one or more B. The character "I" generally indicates an "or" relationship between the associated objects. "At least one of the following" or a similar expression means any combination of these items, including any combination of a single item or a plurality of items. For example, at least one of a, b, or c may represent a, b, c, a-b, a-c, b-c, or a-b-c, where there may be one or more a, one or more b, and one or more c.

The processor in the embodiments of this application may be a general purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

The memory in the embodiments of this application may be a nonvolatile memory, such as a hard disk drive (hard disk drive, HDD) or a solid-state drive (solid-state drive, SSD), or may be a volatile memory (volatile memory), for example, a random-access memory (random-access memory, RAM). A memory is any other medium that can carry or store desired program code in a form of an instruction or a data structure and that can be accessed by a computer, but no limitation is set thereto.

In the several embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

Persons of ordinary skill in the art may understand that sequence numbers of the foregoing processes do not mean execution sequences in the embodiments provided in this application. The execution sequences of the processes should be determined according to functions and internal logic of the processes, and should not be construed as any limitation on the implementation processes of the embodiments in this application.

All or some of the foregoing embodiments may be implemented by software, hardware, firmware, or any combination thereof. When software is used for implementation, the embodiments may be implemented fully or partially in a form of a computer program product. The computer program product includes one or more computer instructions. When the computer program instructions are loaded and executed on the computer, the procedure or functions according to the embodiments in this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared ray, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. A link group configuration method, comprising:
obtaining candidate groups to which M physical ports of a first network device belong respectively, wherein the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, wherein M is an integer greater than 1, and i is an integer ranging from 1 to I-1; and
selecting N physical links from the M physical links, as a link group between the first network device and the second network device, based on the candidate groups to which the M physical ports of the first network device belong respectively, wherein N is an integer greater than 1.

2. The method according to claim 1, wherein the method further comprises:
obtaining candidate groups to which the M physical ports of the second network device belong respectively; and
the selecting N physical links from the M physical links, as a link group between the first network device and the second network device, based on the candidate groups to which the M physical ports of the first network device belong respectively comprises:

selecting the N physical links from the M physical links, as the link group between the first network device and the second network device, based on the candidate groups to which the M physical ports of the first network device belong respectively and the candidate groups to which the M physical ports of the second network device belong respectively.

3. The method according to claim 1, wherein N physical ports, of the -N physical links, that are located in the first network device belong to a same candidate group, and N physical ports, of the N physical links, that are located in the second network device belong to a same candidate group.

4. The method according to claim 2, wherein the obtaining candidate groups to which M physical ports of the first network device belong respectively or the obtaining candidate groups to which the M physical ports of the second network device belong respectively comprises:
obtaining initial candidate group members of each of the M physical ports of the first network device or the second network device; and
obtaining the candidate groups to which the M physical ports of the first network device or the second network device belong respectively, based on the initial candidate group members of each of the M physical ports of the first network device or the second network device.

5. The method according to claim 4, wherein the initial candidate group members of each of the M physical ports of the first network device or the second network device comprise: a physical port in the M physical ports that is a first-type physical port, the first-type physical port receives information sent by a peer physical port of a physical link not faster than the physical port, and an information reception time skew between the first-type physical port and the physical port is not greater than a time skew tolerance of the physical port.

6. The method according to claim 5, wherein the obtaining the candidate groups to which the M physical ports of the first network device or the second network device belong respectively, based on the initial candidate group members of each of the M physical ports of the first network device or the second network device comprises:
for each of the M physical ports of the first network device or the second network device, selecting an initial candidate group with a largest quantity of members from initial candidate groups comprising the physical port, as the candidate group of the physical port.

7. The method according to claim 5, wherein the obtaining the candidate groups to which the M physical ports of the first network device or the second network device belong respectively, based on the initial candidate group members of each of the M physical ports of the first network device or the second network device comprises:
for each of the M physical ports of the first network device or the second network device, selecting an initial candidate group with a smallest in-group maximum time skew from initial candidate groups comprising the physical port, as the candidate group of the physical port, wherein
the in-group maximum time skew is an information reception time skew between a fastest physical port in an initial candidate group and a slowest physical port in the initial candidate group; the fastest physical port in the initial candidate group is a physical port in the initial candidate group fastest in receiving information sent by a peer physical port of a physical link, and the slowest physical port in the initial candidate group is a physical port in the initial candidate group slowest in receiving information sent by a peer physical port of a physical link.

8. The method according to claim 5, wherein the obtaining the candidate groups to which the M physical ports of the first network device or the second network device belong respectively, based on the initial candidate group members of each of the M physical ports of the first network device or the second network device comprises:
for each of the M physical ports of the first network device or the second network device, selecting an initial candidate group with a smallest in-group average time skew from initial candidate groups comprising the physical port, as the candidate group of the physical port, wherein
when a member quantity J of an initial candidate group is greater than 1, the in-group average time skew is an average value of information reception time skews between J-1 physical ports in the initial candidate group other than a fastest physical port and the fastest physical port, wherein the fastest physical port is fastest in receiving information sent by a peer physical port of a physical link.

9. The method according to claim 2, further comprising, if it is impossible to select N physical links from the M physical links, as a link group between the first network device and the second network device, based on the candidate groups to which the M physical ports of the first network device belong respectively and the candidate groups to which the M physical ports of the second network device belong respectively:
adjusting time skew tolerances of the M physical ports of the first network device and the M physical ports of the second network device, based on the candidate groups to which the M physical ports of the first network device belong respectively and the candidate groups to which the M physical ports of the second network device belong respectively, to generate adjusted time skew tolerances of the M physical ports of the first network device and the M physical ports of the second network device; and
obtaining a link group between the first network device and the second network device, based on the adjusted time skew tolerances of the M physical ports of the first network device and the M physical ports of the second network device.

10. The method according to claim 2, further comprising, if it is impossible to select N physical links from the M physical links, as a link group between the first network device and the second network device, based on the candidate groups to which the M physical ports of the first network device belong respectively and the candidate groups to which the M physical ports of the second network device belong respectively:
selecting M-1 physical links from the M physical links between the first network device and the second network device, wherein M is an integer greater than 2;
determining candidate groups to which M-1 physical ports of the first network device belong respectively, and determining candidate groups to which M-1 physical ports of the second network device belong respectively; and
selecting N physical links from the M-1 physical links, as the link group between the first network device and the second network device, based on the candidate groups to which the M-1 physical ports of the first network device belong respectively and the candidate groups to which the M-1 physical ports of the second network device belong respectively.

11. A link group configuration method, comprising:
sending, by a first network device to a link group configuration device, information about candidate groups to which M physical ports of the first network device belong respectively, wherein the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of the physical link, wherein M is an integer greater than 1, and i is an integer ranging from 1 to I-1; and
receiving, by the first network device, information, about a link group between the first network device and the second network device, sent by the link group configuration device.

12. The method according to claim 11, further comprising, before the sending, by a first network device to a link group configuration device, candidate groups to which M physical ports of the first network device belong respectively:
obtaining, by the first network device, initial candidate group members of each of the M physical ports of the first network device; and
obtaining the candidate groups to which the M physical ports belong respectively, based on the initial candidate group members of each of the M physical ports of the first network device.

13. A link group configuration apparatus, comprising:
a transceiver;
a processor; and
a non-transitory computer-readable storage medium storing a program that when executed by the processor, cause the link group configuration apparatus to perform operations comprising:
obtaining candidate groups to which M physical ports of a first network device belong respectively, wherein the M physical ports of the first network device are connected to M physical ports of a second network device to form M physical links, when a member quantity I of a candidate group is greater than 1, an information reception time skew between an $i^{th}$ physical port in the candidate group and a slowest physical port in the candidate group is not greater than a time skew tolerance of the $i^{th}$ physical port, and the $i^{th}$ physical port is a physical port in the candidate group other than the slowest physical port, and the slowest physical port in the candidate group is a physical port in the candidate group slowest in receiving information sent by a peer physical port of a physical link, wherein M is an integer greater than 1, and i is an integer ranging from 1 to I-1; and
selecting N physical links from the M physical links, as a link group between the first network device and the second network device, based on the candidate groups to which the M physical ports of the first network device belong respectively, wherein N is an integer greater than 1.

14. The apparatus according to claim 13, wherein the operations further comprise:
obtaining candidate groups to which the M physical ports of the second network device belong respectively; and
selecting the N physical links from the M physical links, as the link group between the first network device and the second network device, based on the candidate groups to which the M physical ports of the first network device belong respectively and the candidate groups to which the M physical ports of the second network device belong respectively.

15. The apparatus according to claim 13, wherein N physical ports, of the N physical links, that are located in the first network device belong to a same candidate group, and N physical ports, of the N physical links, that are located in the second network device belong to a same candidate group.

16. The apparatus according to claim 14, wherein the obtaining candidate groups to which M physical ports of the first network device belong respectively or the obtaining candidate groups to which the M physical ports of the second network device belong respectively comprises:
obtaining initial candidate group members of each of the M physical ports of the first network device or the second network device; and
obtaining the candidate groups to which the M physical ports of the first network device or the second network device belong respectively, based on the initial candidate group members of each of the M physical ports of the first network device or the second network device.

17. The apparatus according to claim 16, wherein the initial candidate group members of each of the M physical ports of the first network device or the second network device comprise: a physical port in the M physical ports that is a first-type physical port, the first-type physical port receives information sent by a peer physical port of a physical link not faster than the physical port, and an information reception time skew between the first-type physical port and the physical port is not greater than a time skew tolerance of the physical port.

18. The apparatus according to claim 14, wherein the operations further comprise:
if it is impossible to select N physical links from the M physical links, as a link group between the first network device and the second network device, based on the candidate groups to which the M physical ports of the first network device belong respectively and the candidate groups to which the M physical ports of the second network device belong respectively,
adjusting time skew tolerances of the M physical ports of the first network device and the M physical ports of the second network device, based on the candidate groups to which the M physical ports of the first network device belong respectively and the candidate groups to which the M physical ports of the second network device belong respectively.

19. The apparatus according to claim 17, wherein the operations further comprise if it is impossible to select N physical links from the M physical links, as a link group between the first network device and the second network device, based on the candidate groups to which the M physical ports of the first network device belong respectively and the candidate groups to which the M physical ports of the second network device belong respectively, selecting M-1 physical links from the M physical links between the first network device and the second network device, wherein M is an integer greater than 2.

* * * * *

UNITED STATES PATENT AND TRADEMARK OFFICE
CERTIFICATE OF CORRECTION

| | |
|---|---|
| PATENT NO. | : 11,252,043 B2 |
| APPLICATION NO. | : 17/129948 |
| DATED | : February 15, 2022 |
| INVENTOR(S) | : Chen et al. |

It is certified that error appears in the above-identified patent and that said Letters Patent is hereby corrected as shown below:

In the Claims

Claim 16, at Column 50, Line 23, replace "comprisses" with "comprises".

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*